United States Patent
Matherly et al.

(10) Patent No.: US 6,439,309 B1
(45) Date of Patent: Aug. 27, 2002

(54) COMPOSITIONS AND METHODS FOR CONTROLLING PARTICULATE MOVEMENT IN WELLBORES AND SUBTERRANEAN FORMATIONS

(75) Inventors: Ronald M. Matherly, Sugar Land; Allan R. Rickards, Pinehurst; Jeffrey C. Dawson, Spring, all of TX (US)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 09/736,478

(22) Filed: Dec. 13, 2000

(51) Int. Cl.$^7$ .................. E21B 33/138; E21B 43/04

(52) U.S. Cl. .................. 166/276; 166/280; 166/281; 166/295; 507/219; 507/924; 428/405; 428/407; 523/131

(58) Field of Search .................. 166/276, 280, 166/281, 295, 308; 405/264; 428/405, 407; 507/117, 219, 924; 523/130, 131, 132

(56) References Cited

U.S. PATENT DOCUMENTS

| | | | |
|---|---|---|---|
| 3,089,542 A | 5/1963 | Kolodny | |
| 3,155,159 A | 11/1964 | McGuire et al. | |
| 3,254,064 A | 5/1966 | Nevins | |
| 3,341,501 A * | 9/1967 | Hedrick et al. | 524/588 |
| 3,363,690 A | 1/1968 | Fischer | |
| 3,387,888 A | 6/1968 | Shock et al. | 299/4 |
| 3,457,323 A * | 7/1969 | Stengle, Jr. | 428/447 |
| 3,481,401 A | 12/1969 | Graham | 166/280 |
| 3,492,147 A | 1/1970 | Young et al. | |
| 3,498,872 A * | 3/1970 | Sterman et al. | 264/175 |
| 3,659,651 A | 5/1972 | Graham | 166/280 |
| 3,677,941 A | 7/1972 | Mazzara et al. | |
| 3,772,353 A * | 11/1973 | Joy | 556/414 |
| 3,798,186 A * | 3/1974 | Itami et al. | 166/293 |
| 3,888,311 A | 6/1975 | Cooke, Jr. | 166/280 |
| 3,917,345 A | 11/1975 | Davidson et al. | 299/5 |
| 3,929,191 A | 12/1975 | Graham et al. | 166/276 |
| 3,998,744 A | 12/1976 | Arnold et al. | |
| 4,049,866 A | 9/1977 | Lane et al. | 428/402 |
| 4,113,691 A * | 9/1978 | Ward | 427/214 |
| 4,137,182 A | 1/1979 | Golinkin | |
| 4,193,453 A | 3/1980 | Golinkin | 166/295 |
| 4,518,039 A | 5/1985 | Graham et al. | 166/276 |
| 4,527,627 A | 7/1985 | Graham et al. | 166/280 |
| 4,531,594 A | 7/1985 | Cowan | 175/72 |
| 4,664,619 A | 5/1987 | Johnson et al. | 431/154 |
| 4,664,819 A | 5/1987 | Glaze et al. | |
| 4,675,367 A * | 6/1987 | Policastro et al. | 525/422 |
| 4,779,680 A | 10/1988 | Sydansk | 166/300 |
| 4,869,960 A | 9/1989 | Gibb et al. | 428/405 |
| 4,913,824 A | 4/1990 | Kneller | 210/701 |
| 4,969,523 A | 11/1990 | Martin et al. | 166/278 |
| 5,028,271 A | 7/1991 | Huddleston et al. | 106/720 |
| 5,180,020 A | 1/1993 | Fuh | 175/72 |
| 5,207,282 A | 5/1993 | Fuh | 175/72 |
| 5,243,010 A * | 9/1993 | Choi et al. | 528/10 |
| 5,251,697 A | 10/1993 | Shuler | 166/268 |
| 5,330,005 A | 7/1994 | Card et al. | 166/280 |
| 5,381,864 A | 1/1995 | Nguyen et al. | 166/280 |
| 5,420,174 A | 5/1995 | Dewprashad | |
| 5,422,183 A | 6/1995 | Sinclair et al. | 428/403 |
| 5,439,055 A | 8/1995 | Card et al. | 166/280 |
| 5,439,059 A | 8/1995 | Harris et al. | 166/300 |
| 5,473,041 A * | 12/1995 | Itoh | 528/26 |
| 5,492,178 A | 2/1996 | Nguyen et al. | 166/276 |
| 5,501,274 A | 3/1996 | Nguyen et al. | 166/276 |
| 5,501,275 A | 3/1996 | Card et al. | 166/280 |
| 5,531,274 A | 7/1996 | Bienvenu, Jr. | 166/280 |
| 5,582,249 A | 12/1996 | Caveny et al. | 166/276 |
| 5,604,186 A | 2/1997 | Hunt et al. | 507/204 |
| 5,697,440 A | 12/1997 | Weaver et al. | 166/281 |
| 5,775,425 A | 7/1998 | Weaver et al. | 166/276 |
| 5,779,787 A | 7/1998 | Brothers et al. | |
| 5,787,986 A | 8/1998 | Weaver et al. | 166/280 |
| 5,833,000 A | 11/1998 | Weaver et al. | 166/276 |
| 5,837,656 A | 11/1998 | Sinclair et al. | |
| 5,839,510 A | 11/1998 | Weaver et al. | 166/276 |
| 5,955,144 A | 9/1999 | Sinclair et al. | |
| 5,964,295 A | 10/1999 | Brown et al. | 166/308 |
| 6,016,869 A | 1/2000 | Burts, Jr. | 166/295 |
| 6,016,870 A | 1/2000 | Dewprshad et al. | 166/295 |
| 6,047,772 A * | 4/2000 | Weaver et al. | 166/276 |
| 6,059,034 A | 5/2000 | Rickards et al. | 166/280 |
| 6,210,790 B1 * | 4/2001 | Crivello | 428/325 |

FOREIGN PATENT DOCUMENTS

| | | |
|---|---|---|
| DE | 197 23 661 A1 | 4/2000 |
| EP | 0 771 935 A1 | 7/1997 |
| EP | 0 853 186 A2 | 7/1998 |
| EP | 0 859 125 A1 | 8/1998 |
| EP | 0 879 935 A2 | 11/1998 |
| EP | 0 933 498 A1 | 8/1999 |
| EP | 1001133 A1 | 5/2000 |
| GB | 994377 | 6/1965 |
| GB | 2 225 364 A | 5/1990 |
| GB | 2319 796 A | 6/1998 |
| JP | 06228163 A | 8/1994 |
| WO | WO 96/04464 | 2/1996 |
| WO | WO 98/54234 | 12/1998 |
| WO | WO 99/27229 | 6/1999 |

OTHER PUBLICATIONS

"Well Cementing," Erik B. Nelson ed., Schlumberger Educational Services, Elsevier Science Publishing Company Inc., 1990, pp. 3–31 to 3–35.

Westvaco, Product Data Bulletin, Westvaco DTC–275 (Dec. 1991).

(List continued on next page.)

Primary Examiner—George Suchfield
(74) Attorney, Agent, or Firm—O'Keefe, Egan & Peterman, LLP

(57) ABSTRACT

Silyl-modified polyamides, and subterranean formation treatments employing silyl-modified polyamides to minimize migration or movement of naturally occurring or introducable solid particulates within a subterranean formation and/or within a wellbore penetrating a subterranean formation.

27 Claims, 3 Drawing Sheets

OTHER PUBLICATIONS

Westvaco, Product Data Bulletin, Westvaco DTC–295 (Dec. 1991).

Westvaco, Product Data Bulletin, Westvaco DTC–155 (Dec. 1991).

Westvaco, Product Data Bulletin, Westvaco DIACID 1550 dicarboxylic acid (Dec. 1991).

Westvaco, Product Data Bulletin, Westvaco DTC–195 (Jul. 1987).

Westvaco, Product Data Bulletin, Westvaco DTC–298 (Dec. 1991).

Westvaco, Product Data Bulletin, Westvaco DTC–409 oil field chemical (Dec. 1991).

Westvaco, Product Data Bulletin, Westvaco DIACID H–240 surfactant–hydrotrope (Oct. 1991).

Westvaco, Product Data Bulletin, TENAX 2010 Maleated Tall Oil Fatty Acid (Oct. 1992).

Air Products, "Specialty Chemicals From Air Products," 2 pages (1991).

U.S. patent application Ser. No. 09/662,074 entitled "Compositions and Methods for Cementing Using Elastic Particles" by Brannon et al., filed on Sep. 14, 2000 (BJSC:285).

U.S. patent application Ser. No. 09/519,238 entitled "Formation Treatment Method Using Deformable Particles" by Rickards et al., filed on Mar. 6, 2000 (BJSC:288).

U.S. patent application Ser. No. 09/579,146 entitled "Lightweight Methods and Compositions for Sand Control" by Brannon, et al., filed May 25, 2000 (BJSC:294).

U.S. patent application Ser. No. 09/579,147 entitled "Light Weight Methods and Compositions for Well Treating" by Brannon et al., filed May 25, 2000 (BJSC:295).

Foreign Search Report dated Mar. 3, 1998 for GB Application No. 9725153.2 (reference B8), a counterpart to Danish Application No. 1333/97 from which references A42 and B7 claim priority.

International Search Report dated Oct. 13, 1998 for PCT/US98/10735 (reference B7).

Ward, "Industrial Utilization of $C_{21}$ Dicarboxylic Acid," *Journal of the American Oil Chemists' Society*, vol. 52, pp. 219–224 (Sep. 1974).

Harold A. Whittcoff and Bryan G. Rueben, "Industrial Organic Chemicals," *John wiley & Sons, Inc.*, Chapter 13.3, pp. 368–369, (1996).

Brochure, "Functional Products Group Coatings & Ink Division," *Henkel*.

Foreign search report dated Aug. 11, 1999 for Dutch Patent Application No. 1007616 (counterpart to Reference B8, and to Danish Application No. 1333/97 from which references A42 and B7 claim priority).

Martin, "Fracturing Recommendation" for Conoco State A 29#8, BJ Services, Feb. 4, 1999.

Martin, "Fracturing Recommendation" for Conoco State A 29#8, BJ Services, Feb. 5, 1999.

Treatment Report for Conoco State A 29#8, Feb. 11, 1999.

Invoice for treatment of Conoco State A 29#8, Feb. 11, 1999.

BJ Services, "FlexSand™ Proppant Pack Enhancement Additive" Ad, Mar. 2000 issue of Journal of Petroleum Technology.

Dow, "The Dow Family of Ethyleneamine Products," 2 pages.

* cited by examiner

COMPOSITIONS AND METHODS FOR CONTROLLING PARTICULATE MOVEMENT IN WELLBORES AND SUBTERRANEAN FORMATIONS

BACKGROUND OF THE INVENTION

1. Field of the Invention

This invention relates to silyl-modified polyamide compositions. This invention also relates generally to subterranean formation treatments and, more specifically, to subterranean formation treatments employing silyl-modified polyamides to minimize migration or movement of naturally occurring or introducable solid particulates within a subterranean formation, and/or a wellbore penetrating a subterranean formation.

2. Description of the Related Art

Production of particulate solids with subterranean formation fluids is a common problem. The source of these particulate solids may be unconsolidated material from the formation (including fines), proppant from a fracturing treatment, particulate from a sand control treatment and/or fines generated from crushed fracture proppant. Production of solid proppant material is commonly known as "proppant flowback." In addition to causing increased wear on downhole and surface production equipment, the presence of particulate materials in production fluids may also lead to significant expense and production downtime associated with removing these materials from wellbores and/or production equipment. Accumulation of these materials in a wellbore may also restrict or even prevent fluid production. In addition, loss of proppant due to proppant flowback may also reduce conductivity of a fracture pack.

Hydraulic fracturing is a common stimulation technique used to enhance production of fluids from subterranean formations. In a typical hydraulic fracturing treatment, fracturing treatment fluid containing a solid proppant material is injected into the formation at a pressure sufficiently high enough to cause the formation or enlargement of fractures in the reservoir. During a typical fracturing treatment, proppant material is deposited in a fracture, where it remains after the treatment is completed. After deposition, the proppant material serves to hold the fracture open, in doing so enhancing the ability of fluids to migrate from the formation to the well bore through the fracture. Because fractured well productivity depends on the ability of a fracture to conduct fluids from a formation to a wellbore, fracture conductivity is an important parameter in determining the degree of success of a hydraulic fracturing treatment.

One problem related to hydraulic fracturing treatments is the creation of reservoir "fines" and associated reduction in fracture conductivity. These fines may be produced when proppant materials are subjected to reservoir closure stresses within a formation fracture which cause proppant materials to be compressed together in such a way that small particles ("fines") are generated from the proppant material and/or reservoir matrix. In some cases, production of fines may be exacerbated during production/workover operations when a well is shut-in and then opened up. This phenomenon is known as "stress cycling" and is believed to result from increased differential pressure and closure stress that occurs during fluid production following a shut-in period. Production of fines is undesirable because of particulate production problems, and because of reduction in reservoir and/or fracture proppant pack permeability due to plugging of pore throats in the reservoir matrix and/or proppant pack. Fines composed of formation material (e.g., shale, sand, coal fines, etc.) may present similar problems and may be produced, for example, within a hydraulically fractured formation due to stresses and forces applied to the formation during the fracture treatment.

In an effort to control or prevent production of formation or proppant materials, many methods have been developed. Included among these are those methods commonly referred to as gravel packing and frac packs. These methods commonly employ particulate materials that are placed downhole with a gelled carrier fluid (e.g., aqueous-based fluid such as gelled brine). For example, a gravel pack operation may be carried out on a wellbore that penetrates a subterranean formation to address the production of formation particles into the wellbore from the formation during production of formation fluids. In such a method, a screen assembly may be placed within the wellbore adjacent the subterranean formation. Particulate material may be introduced with a carrier fluid into the wellbore and placed adjacent the subterranean formation by circulation so as to form a fluid-permeable pack in an annular area between the exterior of the screen and the interior of the wellbore that serves to reduce or substantially prevent the passage of formation particles from the subterranean formation into the wellbore during production of fluids from the formation, while at the same time allowing passage of formation fluids from the subterranean formation through the screen into the wellbore.

In another gravel pack method, particulate material may be introduced into a wellbore and placed opposite a formation (open hole, perforations, etc.) in the absence of a screen, and then consolidated with a curable resin (e.g., present as a self-curing coating on the particles, a curable coating on the particles that is cured with a separately introduced binding agent, etc.) or other suitable material to form a permeable consolidated mass. A core of the consolidated permeable mass may then be drilled out, leaving an annular sheath or pack of consolidated and permeable material to reduce or substantially prevent the passage of formation particles from the subterranean formation into the wellbore during production of fluids from the formation, while at the same time allowing passage of formation fluids from the subterranean formation through the screen into the wellbore, in a manner similar to that described for the gravel pack with screen. In some cases, consolidatable particulate materials may alternatively be employed in conjunction with gravel pack screens, in a manner similar to that previously described. In either case, conventional curable resins typically employed for consolidation purposes (e.g., epoxide resins) are often responsible for reduction in permeability or conductivity of the formation and/or sand control particulate pack.

In other examples, fracturing methods utilizing special types of proppants and/or additives to proppants have been employed to help form a fracture pack in the reservoir which is resistant to proppant flowback. One method of this type utilizes resin-coated proppant materials designed to help form a consolidated and permeable fracture pack when placed in the formation. Among the ways this method may be carried out are by mixing a proppant particulate material with an epoxy resin system designed to harden once the material is placed in the formation, or by the use of a pre-coated proppant material which is pumped into the formation with the fracturing fluid and then consolidated with a curing solution pumped after the proppant material is in place. Although resin-coated proppant techniques may reduce proppant flowback, they may also suffer from various problems, including incompatibility of resins with cross-linker and breaker additives in the fracturing fluid, and long post-treatment shut-in times which may be economically undesirable. Resin-coated proppants may also be difficult to place uniformly within a fracture and may adversely affect fracture conductivity. In addition, if desired, resin-coated proppants may only be added to the final stages of fracturing treatments due to their expense, resulting in a fracture pack that is consolidated only in a region near the well bore.

Recently, techniques employing a mixture of solid proppant materials designed to achieve proppant flowback control have been developed. In one technique, rod-like fibrous materials are mixed with proppant material for the purpose of causing particle bridging within a fracture proppant pack so as to inhibit particle migration and proppant flowback. This technique is believed to control proppant flowback by forming a "mat" of fibers across openings in the pack which tends to hold the proppant in place and limit proppant flowback during fluid production. However, in practice this method has proven to have several drawbacks, including reduction in fracture conductivity at effective concentrations of fibrous materials, and an effective life of only about two years due to slight solubility of commonly used fiber materials in brine. In addition, fiber proppant material used in the technique may be incompatible with some common well-treating acids, such as hydrofluoric acid.

In other recently developed methods, thermoplastic material in the form of ribbons or flakes is mixed with proppant material in order to form a fracture proppant pack that is resistant to proppant flowback. The thermoplastic material is designed to intertwine with proppant particles and become "very tacky" at reservoir temperatures such as those greater than about 220° F. In doing so, the materials are believed to adhere to proppant material to form agglomerates that bridge against each other and help hold proppant materials in place. In a related method disclosed in U.S. Pat. No. 5,787,986, a solution of a "tackifying compound" is incorporated in intimate mixture with a particulate material and introduced into a subterranean formation. Compounds suitable for use as such a tackifying compound include compounds which when in liquid form or in a solvent solution will form a non-hardening coating, by themselves, upon the particulate. U.S. Pat. No. 5,839,510 discloses a method of treating a subterranean formation by providing a fluid suspension including a mixture of particulate material, a material including a liquid or solution of a tackifying compound, and a hardenable resin; and pumping the fluid suspension through the wellbore and depositing the mixture in the formation. U.S. Pat. No. 5,775,425 discloses a method of treating a subterranean formation by introducing a tackifying compound into a subterranean formation in a diluent containing solution to deposit upon previously introduced particulates.

Those methods employing tacky or adhesive materials to control proppant flowback suffer similar drawbacks as the fiber proppant additive method described above, most notably reduced formation or pack conductivity. Addition of separate hardenable resins increases operational complexity of well treatments and well treatment fluid formulation.

SUMMARY OF THE INVENTION

Disclosed are silyl-modified polyamide compounds that in one embodiment, may be described as substantially self-hardening compositions. In another embodiment, these compounds may also be characterized as self-crosslinking in nature. Also disclosed are methods of controlling particulate movement in wellbores and subterranean formations using well treatment fluids that include the disclosed silyl-modified polyamide compounds. Surprisingly and advantageously, when the disclosed silyl-modified polyamide compounds are introduced in the unhardened state into a subterranean wellbore and/or formation, these compounds are capable of at least partially adhering to naturally-occurring particulates or to introducable particulates that are introduced into a wellbore and/or formation, and then are further capable of self-hardening themselves to a substantially non-tacky state without the need for the presence of separate hardening components reactant components.

Because the disclosed silyl-modified polyamide compounds s elf-harden to a substantially non-tacky state, particulate movement is controlled without productivity or conductivity loss caused by formation or proppant pack pore throat blockage due to collection or accumulation of relatively small fines in pore throats. Such accumulation of relatively small fines is believed to occur due to in situ adherence of small mobile fines to conventional tacky or adhesive resin materials present in the pore throats. Further, because no separate hardening reactant components are required, well treatment fluid formulation and well treatment operations are greatly simplified over conventional multiple-component resin systems. Further surprisingly, the ultimate in situ nature of the disclosed self-hardened silyl-modified polyamide compounds may be controlled so as to be substantially non-tacky, but pliable. Advantageously, when so formulated, the pliable nature of the disclosed silyl-modified polyamide compounds may be used to absorb relatively large changes in wellbore and/or formation stresses (eg., in formations subject to high stress cycling) so as to substantially cushion particulates, thus reducing or substantially preventing fines creation while at the same time controlling particulate movement.

Thus, in one respect disclosed is a well treatment method that includes introducing a well treatment fluid including a silyl-modified polyamide compound into a wellbore penetrating a subterranean formation. The silyl-modified polyamide compound may be substantially self-hardening. In one embodiment , the well treatment fluid may include introducable particulate material suspended within the well treatment fluid, the introducable particulate material being at least partially coated with the silyl-modified polyamide in an amount effective to reduce or substantially prevent movement of at least a portion of the individual particles of the introducable particulate material when the particulates are subjected to fluid flow within the wellbore or subterranean formation; and the method may further include forming the well treatment fluid prior to introducing the well treatment fluid into the wellbore by combining a carrier fluid with the introducable particulate material that is at least partially coated with the silyl-modified polyamide to form the well treatment fluid. The method may further include applying the silyl-modified polyamide to an introducable particulate material to form the introducable particulate material that is at least partially coated with the silyl-modified polyamide, prior to combining the carrier fluid with the introducable particulate material that is at least partially coated with the silyl-modified polyamide to form the well treatment fluid.

In another embodiment, the method may further include contacting at least one of introducable or naturally occurring particulates present in at least one of the wellbore or the subterranean formation with the well treatment fluid; and the silyl-modified polyamide may be present in the well treatment fluid in an amount effective to at least partially coat and adhere to the introducable or naturally occurring particulates and to reduce or substantially prevent movement of at least a portion of the introducable or naturally occurring particulates contacted by the well treatment fluid when the particulates are subjected to fluid flow within the wellbore or subterranean formation. The method may further include allowing the silyl-modified polyamide that is at least partially coated and adhered to the introducable or naturally occurring particulates to self-harden to a substantially non-tacky state to which additional individual particulates will not adhere. The well treatment fluid may further include introducable particulate material suspended within the well treatment fluid; and the method may further include allowing the silyl-modified polyamide to contact the introducable particulate material while suspended within the well treatment fluid so as to at least partially coat and adhere to at least a portion of the introducable particulate material prior to introducing the well treatment fluid into the wellbore.

In one embodiment, the well treatment fluid may be a fracture treatment fluid; and the method may further include introducing the fracture treatment fluid into the subterranean formation at a pressure above the fracturing pressure of the subterranean formation and depositing at least a portion of the introducable particulate material into a fracture created in the subterranean formation during the well treatment. In another embodiment, the method may further include placing the introducable particulate material adjacent the subterranean formation to form a fluid-permeable pack that is capable of reducing or substantially preventing the passage of formation particles from the subterranean formation into the wellbore while at the same time allowing passage of formation fluids from the subterranean formation into the wellbore. In this regard, a screen assembly having inner and outer surfaces may be disposed within the wellbore, at least a portion of the outer surface of the screen assembly being disposed adjacent the subterranean formation; and the method may further include placing at least a portion of the introducable particulate material between the outer surface of the screen assembly and the subterranean formation to form the fluid-permeable pack. In another embodiment, the well treatment fluid may be a particulate consolidation treatment fluid containing substantially no introducable particulate material, and the method may further include allowing the silyl-modified polyamide to self-harden to substantially consolidate at least one of the introducable or naturally occurring particulate materials.

In one embodiment, introducable or naturally occurring particulate materials may subjected to stress cycling within the wellbore or the subterranean formation, and the silyl-modified polyamide may be formulated so as to self-harden to be substantially non-tacky and to have a substantially pliable in situ elastic modulus under downhole conditions so as to be capable of yielding upon particle to particle stress between individual particles of the introducable or naturally occurring particulate material that are at least partially adhered to by the silyl-modified polyamide during the stress cycling, so that an in situ creation of fines between individual particles of the introducable or naturally occurring particulate material at least partially adhered to by the silyl-modified polyamide is less than an in situ creation of fines between individual particles of the introducable or naturally occurring particulate material that are not at least partially adhered to by the silyl-modified polyamide.

In another respect, disclosed herein is a well treatment method that includes introducing a well treatment fluid into a wellbore penetrating a subterranean formation, and in which the well treatment fluid includes a silyl-modified polyamide compound that is a reaction product of a polyamide compound and a silating compound. The method may include contacting at least one of introducable or naturally occurring particulates present in at least one of the wellbore or the subterranean formation with the well treatment fluid. The well treatment fluid may include introducable particulate material suspended within the well treatment fluid that is at least partially coated with the silyl-modified polyamide in an amount effective to reduce or substantially prevent movement of at least a portion of the individual particles of the introducable particulate material when the particulates are subjected to fluid flow within the wellbore or subterranean formation, the silyl-modified polyamide may be present in the well treatment fluid in an amount effective to at least partially coat and adhere to the introducable or naturally occurring particulates and to reduce or substantially prevent movement of at least a portion of the introducable or naturally occurring particulates contacted by the well treatment fluid when the particulates are subjected to fluid flow within the wellbore or subterranean formation, or a combination thereof may exist.

In another respect, disclosed is a silyl-modified polyamide compound that may be employed in the methods disclosed herein, as well as for other purposes. In one embodiment, the silyl-modified polyamide compound may include monomeric units having a formula that is at least one of:

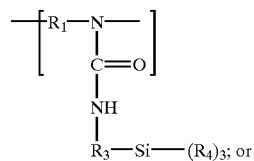

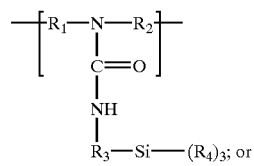

a mixture thereof; and wherein each $R_1$ is independently an alky amine or alkyl amido-amine functional group having a terminal polyacid-based functionality; wherein each $R_2$ is independently an alky amine or alkyl amido-amine functional group; wherein each $R_3$ is independently an alkyl-based group having from about 1 to about 18 carbon atoms; and wherein each $R_4$ is independently an alkoxy group having from about 1 to about 3 carbon atoms.

In another embodiment, the silyl-modified polyamide compound may include:

from about 0% to about 100% by weight of monomeric units of the formula

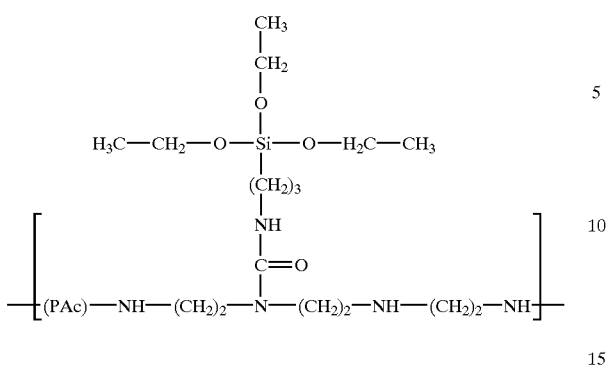

from about 0% to about 100% by weight of monomeric units of the formula

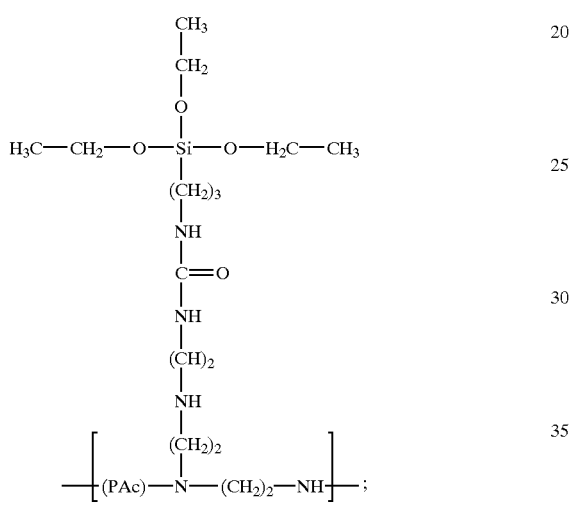

from about 0% to about 100% by weight of monomeric units of the formula

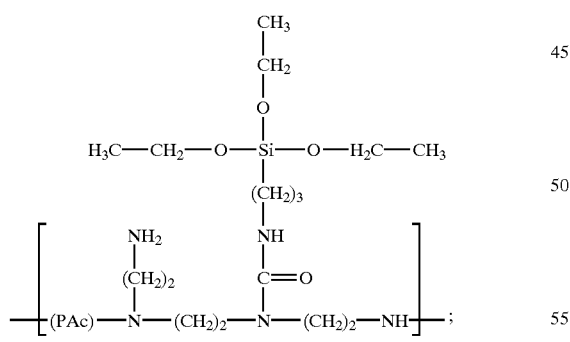

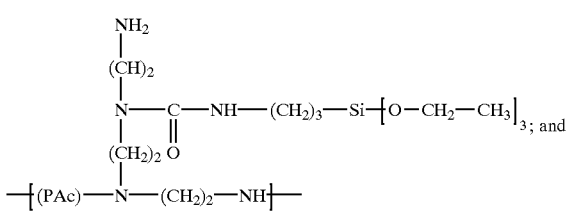

from about 0% to about 100% by weight of monomeric units of the formula

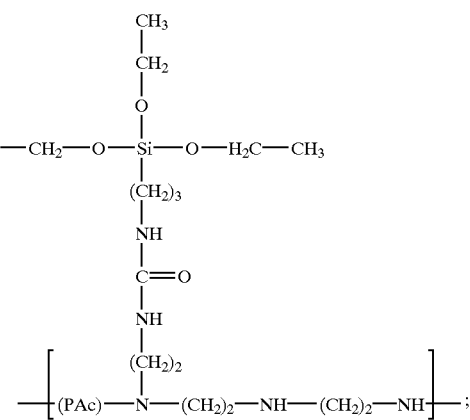

wherein for any given individual monomeric unit of the silyl-modified polyamide compound, (PAc) includes a polyacid-based functional group based on a polyacid having from about 2 to about 4 carboxyl functionalities. In one embodiment, for any given individual monomeric unit of the silyl-modified polyamide compound, (PAc) may include a diacid-based functional group that may be individually either one of:

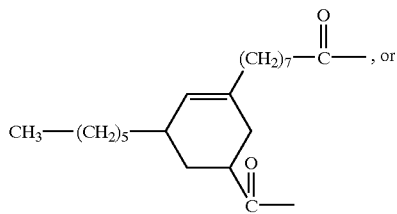

The total of all the monomeric units present in the silyl-modified polyamide compound may include about 100% by weight of the silyl-modified polyamide compound.

In another embodiment, the silyl-modified polyamide compound may include:

from about 0% to about 100% by weight of monomeric units of the formula

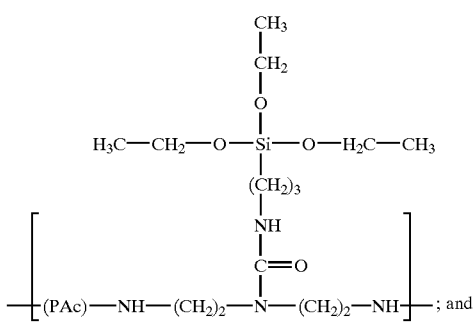

from about 0% to about 100% by weight of monomeric units of the formula

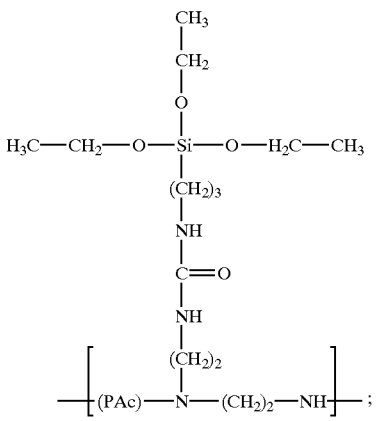

wherein for any given individual monomeric unit of the silyl-modified polyamide compound, (PAc) includes a polyacid-based functional group based on a polyacid having from about 2 to about 4 carboxyl functionalities. In one embodiment, for any given individual monomeric unit of the silyl-modified polyamide compound, (PAc) include a diacid-based functional group that may be individually either one of:

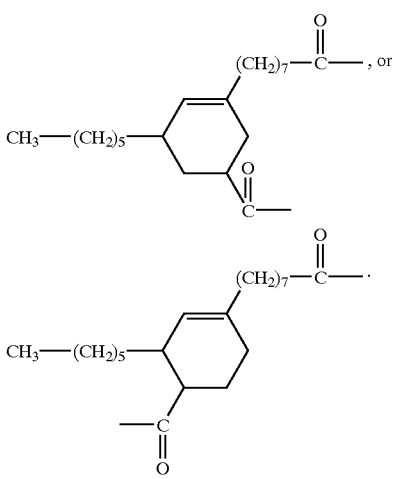

The total of all the monomeric units present in the silyl-modified polyamide compound may include about 100% by weight of the silyl-modified polyamide compound.

In another respect, disclosed is a composition including the reaction product of a polyamide compound and a silating compound. In one embodiment, the polyamide compound may contain at least one secondary amine group, and the silating compound may include an alkoxysilane-based compound having at least one substituted reactive group capable of reacting with the at least one secondary amine group on the polyamide compound, with one or more of the silicon atoms present in each molecule of the silating compound having one or more alkoxy functionalities bonded thereto. The polyamide may include a polyamide intermediate compound that is the reaction product of a polyamine and a polyacid, the polyamine including at least three amine groups per molecule, the polyacid including from about 2 to about 4 acid functionalities per molecule; and the silating compound my include an alkoxysilane-based silating compound. The alkoxysilane-based silating compound may include at least one substituted alkyl functional group bonded to a silicon atom of the alkoxysilane-based silating compound, the substituted alkyl functional group having a terminal reactive isocyano functionality.

In another embodiment, the polyamine may include a polyamine having from about 1 to about 4 secondary amine groups per molecule and may be at least one of an polyalkylene polyamine, aromatic polyamine, or mixture thereof; the polyacid may include at least one of a dimer acid having from about 16 to about 36 carbon atoms, a trimer acid having from about 24 to about 54 carbon atoms, or a mixture thereof; and the alkoxysilane-based silating compound may have from about 1 to about 3 alkoxysilane functionalities bonded to a silicon atom of the alkoxysilane-based silating compound, each of the alkoxysilane-based functionalities including an oxygen atom bonded to the silicon atom and to a terminal alkyl chain having from about 1 to about 18 carbon atoms.

In another embodiment, the polyamine may include at least one of diethylene triamine, triethylene tetraamine, pentaethylene hexamine, or a mixture thereof; the polyacid may include a diacid having the formula:

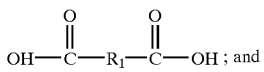

the alkoxysilane-based silating compound may include a compound having the formula:

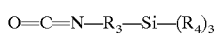

wherein $R_1$ is an alkyl-based group having from about 1 to about 18 carbon atoms; and each $R_4$ is independently an alkoxy group having from about 1 to about 3 carbon atoms.

In another embodiment, the polyamine may include at least one of diethylene triamine, triethylene tetraamine, pentaethylene hexamine, or a mixture thereof; the polyacid may include a diacid having the formula:

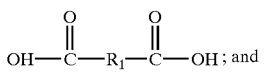

the alkoxysilane-based silating compound may include at least one of gamma-isocyantomethyltriethoxysilane, gamma-isocyantopropyltriethoxysilane, 3-aminopropyltriethoxysilane, or a mixture thereof.

In another embodiment, the polyamine may include at least one of diethylene triamine, triethylene tetraamine, pentaethylene hexamine, or a mixture thereof; the alkoxysilane-based silating compound may include a compound with the formula:

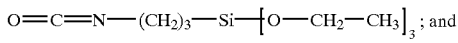

the polyacid may include at least one of:

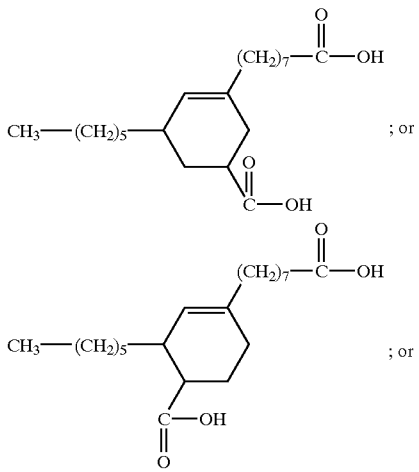

a mixture thereof.

DESCRIPTION OF ILLUSTRATIVE EMBODIMENTS

Figure 1:
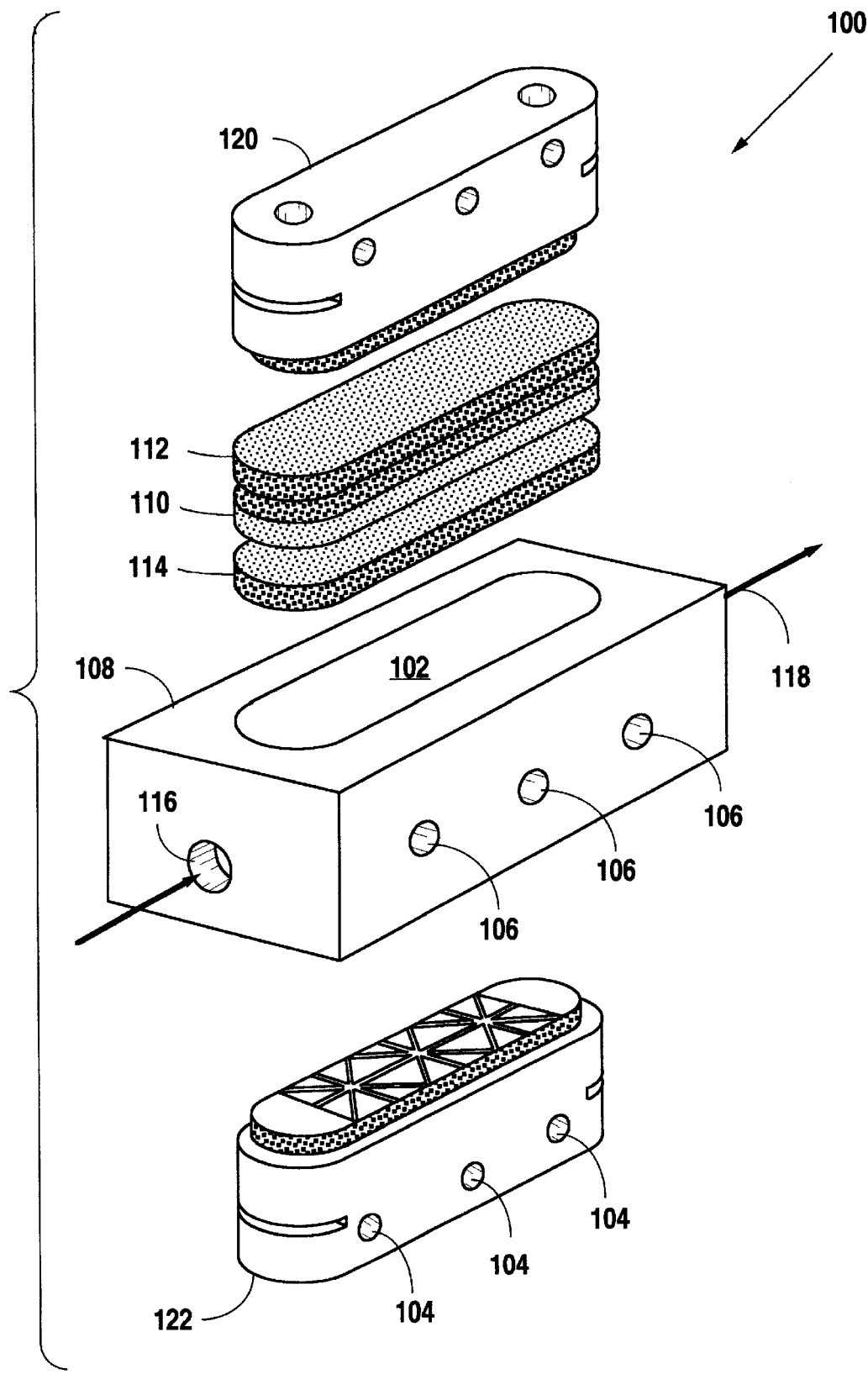
FIG. 1 is a representation of simplified representation of a conductivity test cell apparatus used in the Examples to obtain flowback test data.

In one disclosed embodiment, silyl-modified polyamide compounds may be employed to reduce or substantially prevent movement or migration of introduced and/or naturally occurring particulate solids within a subterranean formation, including migration of such particles with fluid flow from the formation into a wellbore penetrating the formation, or migration within the wellbore with fluid flow therein. Examples of introducable particulate solids include, but are not limited to, particles that may be introduced as part of a sand control well treatment fluid (e.g., gravel pack fluid, frac pack fluid, etc.) or as part of a hydraulic fracturing treatment. In one embodiment, one or more of these compounds may at least partially coat or otherwise adhere to naturally occurring particulate solids or introducable particulate solids that are introduced into a wellbore and/or formation, and to reduce or substantially prevent migration by increasing the surface friction of the particulate material. For example, the compounds may function to substantially control migration of introduced and/or naturally occurring particulate solids by at least partially consolidating at least a portion of the particulate solids in the wellbore and/or formation.

In one embodiment, the disclosed silyl-modified polyamide compounds may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. In other words, while reducing or substantially preventing movement of introduced and/or naturally occurring particulates that are contacted and at least partially adhered to by silyl-modified polyamide compound in its unhardened state, the disclosed silyl-modified polyamide compound substantially does not adhere to later-encountered particulates (such as small formation fines) that may move through pore throats of a formation or proppant pack after the silyl-modified polyamide compound has self-hardened., e.g., thus allowing such fines to substantially move through the pore throats without causing blockage of same.

In another embodiment, the disclosed silyl-modified polyamide compounds may also be described as self-crosslinking in a hydolyzing solution, such as an aqueous-based fluid or brine. Thus, the disclosed silyl-modified polyamide compounds may be further characterized as self-stiffening or self-hardening, meaning that the disclosed compounds themselves (e.g, as they may be introduced into a wellbore alone), are capable of developing an increased elastic modulus upon mixture with an aqueous carrier fluid, in the presence or absence of an introducable solid particulate (e.g., suspended solid particulate) such as a hydraulic fracture proppant or sand control particles. This self-crosslinking property advantageously allows the ultimate in situ compliance or relative hardness of the compound to be controlled by varying the molecular characteristics of the compound prior to performing a well treatment, for example, by varying the amount of isocyano-cyano functional compound reacted with polyamide intermediate compound to form silyl-modified polyamide compound, in a manner as described further herein. For example, in one exemplary embodiment, the ultimate in situ nature of a self-hardened silyl-modified polyamide compound may be characterized as substantially non-tacky, but pliable. In another exemplary embodiment, the ultimate in situ nature of a self-hardened silyl-modified polyamide compound may be characterized as substantially non-tacky and rigid.

Surprisingly and advantageously, the disclosed silyl-modified polyamide compounds may be combined with a carrier fluid, with or without optional introducable particulate solids, to form a well treatment fluid capable of controlling in situ movement of particulate solids (e.g., in the wellbore and/or formation) without the need for addition of, or presence of, separate reactant components, e.g., separate chemical species, separate resins, ions, crosslinking agents, etc. This greatly simplifies well treatment formulation over conventional multiple-component resin systems by reducing the number of required onsite chemicals, number of flow streams, required equipment, required onsite mixing steps, etc. Furthermore, consistency of the ultimate in situ compliance or relative hardness developed by the disclosed compositions may be improved over conventional multiple-component resin systems since development of desired compliance or hardness is not dependent on adequate mixing and/or contact between separate reactant components. For example, the potential that unreacted components of a conventional multi-component resin system may plate out on particulate solids before sufficient reaction with other components of the system is avoided using the disclosed methods and compositions. The risk that one or more of the separate reactant components of a conventional multi-component resin system may participate in undesirable reactions with other components of a well treatment fluid (e.g., viscosifier, gelled fluid cross-linker, etc.) is also avoided.

Examples of particulate solids with which the disclosed methods and compositions may be advantageously employed include, but are not limited to, unconsolidated material from the formation (including formation fines), proppant particulate such as is introducable into the formation during a fracturing or frac pack treatment, fines generated in situ from crushed fracture proppant, particulate such as is introducable into the formation and/or a wellbore penetrating the formation during a sand control treatment (such as a gravel pack or frac pack), etc. Advantageously, in situ migration or movement of such particulate solids may be reduced or substantially prevented during fluid production from a subterranean formation, so as reduce or substantially eliminate problems associated therewith including, but not limited to, problems such as proppant flowback, reduction in formation permeability, reduction in fracture pack or gravel pack conductivity, wellbore obstruction (or fill), etc. In one embodiment, control of the movement of such particulate solids may be achieved with little or substantially no reduction in formation productivity (i.e., permeability or conductivity).

In one embodiment, a silyl-modified polyamide may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Suitable polyamide intermediate compounds include those having at least one primary or secondary amine group that is available for reaction with a terminal isocyano functionality of an alkoxysilane-based silating compound as described elsewhere herein.

Exemplary general reaction scheme (Equation I) for a diacid and polyamine having three or more amine groups is shown below:

monomeric repeating units of each isomeric unit present in a given molecule so as to correspond to a particular AMU of the reaction product, depending on the reaction conditions used. In this regard, values of X and Y may be sufficient such that X may represent from about 0% to about 100% of the total monomeric repeating units (i.e., total of X+Y) present in the molecule; and Y may represent from about 100% to about 0% of the total monomeric repeating units (X+Y) present in the molecule.

It will be understood that the above values of R, $R_1$ and $R_2$ given in relation to the embodiment of equation (I) are exemplary only, and that values outside these ranges are also possible. It will also be understood that the respective monomeric repeating units corresponding to X and Y may be randomly or systematically distributed within the molecule, or that only one of the monomeric units may be present in a given molecule. Further, mixtures of molecules having varying percentages of monomeric units corresponding to X and Y are also possible.

In the formation of a polyamide intermediate compound, any polyacid or mixture of polyacids may be employed that is capable of reacting with a chosen polyamine or mixture of polyamines to form a polyamide intermediate compound suitable for reaction with an isocyano-functional silating compound so as to form a silyl-modified polyamide not limited to, dimer and trimer acids produced from fatty acids and other carboxylic acids and carboxylic acid derivatives, alkylene or aryl diisocyanates, mixtures thereof, etc. Examples of suitable polyacids include, but are not limited to, dimer acids having from about 16 to about 36 carbon atoms and trimer acids having from about 24 to about 54 carbon atoms. In another embodiment, polyacids having from about 4 to about 42 carbon atoms may be employed. Such suitable polyacids may have, for example, from about 2 to about 4 acid functionalities, and/or may be employed as a mixture of multifunctional polyacids. In one exemplary embodiment, polyacids that result from dimerization of acids such as linoleic and oleic acid may be employed. Linoleic acid may dimerize via Diers Alder reaction and oleic acid may dimerize over natural acid clay catalyst such

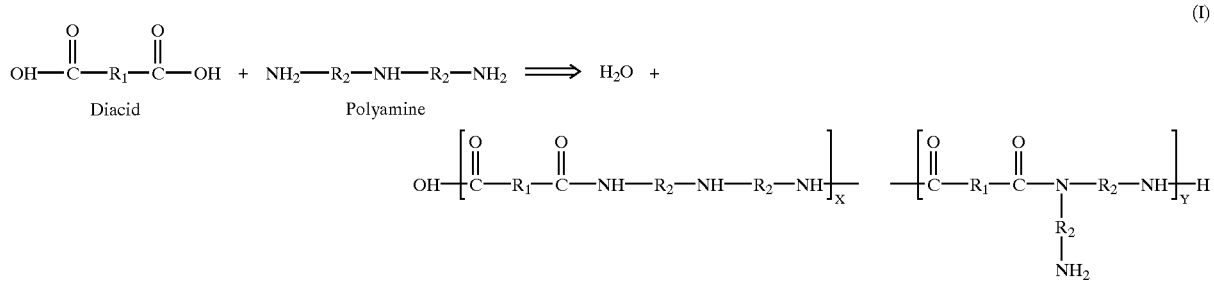

(I)

wherein in one embodiment: $R_1$ may be a branched or straight chain alkyl-based group having from about 2 to about 54 carbon atoms, or cyclic group or alkyl-substituted cyclic group having from about 6 to about 54 carbon atoms; each $R_2$ may be independently a branched or straight chain alkyl-based group having from about 1 to about 6 carbon atoms, or alternatively may be R—NH—R, where each R may be independently a branched or straight chain alkyl-based group having from about 1 to about 6 carbon atoms, and wherein X and Y represent the respective number of as montmorillonite. Further information on dimerization and dimer acids may be found in Wittcoff, Harold A. and Rueben, Bryan G., *Industrial Organic Chemicals,* John Wiley & Sons, Inc., A Wiley-Interscience Publication, Chapter 13, pages 368–69 (1996); and in Ward, et al., *Industrial Utilization of $C_{21}$ Dicarboxylic Acid, Journal of the American Oil Chemists' Society,* Vol. 53, No. 7, pages 219–224 (1975); each of which is incorporated herein by reference.

One example of a suitable polyacid for use in the disclosed method is a 21 carbon atom diacid available as "WESTVACO 1550" from Westvaco of Charleston Heights, S.C. may be employed. This diacid has the following formula (IIA), with isomer (IIB) also present:

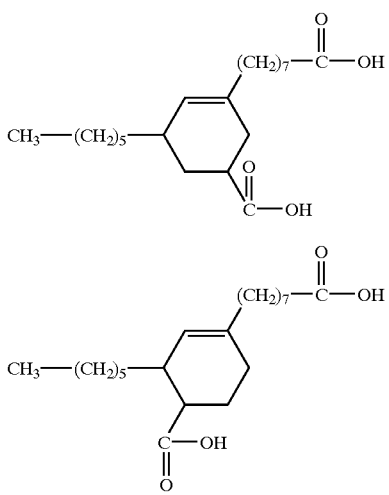

(IIA)

(IIB)

Other suitable polyacids and sources thereof include, but are not limited to, crude dimer-trimer acids such as "DTC-195," "DTC-298," "DTC-409," "DTC-295," "DTC-275," "DTC-155"; dicarboxylic acids derived from fatty acids such as "DIACID 1550" (monocyclic $C_{21}$ dicarboxylic acid); and "TENAX 2010" maleated tall oil fatty acid, all from Westvaco, P.O. Box 70848, Charleston Heights, S.C. 29415-0840. Other examples include, but are not limited to, "SYLVADYM MX," "SYLVADYM T-17," "SYLVADYM T-18," "SYLVADYM T-22," "SYLVADYM T-35," "ARIZONA FA-7001" and "ARIZONA FA-7002" all available from Arizona Chemicals, 1001 East Business Highway 98, Panama City, Fla. 32401. It will be understood that suitable polyacid materials may contain mixtures of dimer, trimer and tetramer groups. For example, dimer-trimer products (e.g., Westvaco "DTC"-series acids) may contain mixtures of dimer, trimer and tetramer groups.

In one embodiment for forming a polyamide intermediate compound, any polyamine or mixture of polyamines may be employed having at least three amine groups per molecule that is capable of reacting with a chosen polyacid or mixture of polyacids to form a polyamide intermediate compound having at least one available primary or secondary amine group available for reaction with an isocyano-functional silating compound so as to form a silyl-modified polyamide having properties as described elsewhere herein. In one embodiment, exemplary polyamines may be further characterized as having from about 1 to about 4 secondary amine groups per molecule. Suitable polyamines include, but are not limited to, alkylene polyamines, polyalkylene polyamines, aromatic polyamines and mixtures thereof. Examples of suitable polyalkylene polyamines include, but are not limited to, polyethylene and/or piperazine-based polyamines such as diethylene triamine ("DETA"), triethylene tetraamine ("TETA"), tris-(2-aminoethyl) amine ("branched TETA"), piperazinylethylethylenediamine ("PEEDA"), bis-(2-aminoethyl) piperazine ("bis AEP"), tetraethylenepentamine ("TEPA"), pentaethylene hexamine, aminoethyltriethlenetetramine ("AETETA"), aminoethlypiperazinylethyl-ethylenediamine ("AEPEEDA"), piperazinylethyl-diethylenetriamine ("PEDETA"), piperazinylethylhexyleneamine ("PEHA"), and mixtures thereof. Such compounds are available from suppliers such as DOW U.S.A. CHEMICAL and METALS DEPARTMENT of DOW CHEMICAL, Midland, Mich.; BOSSCO INDUSTRIES, INC., Houston, Tex. (e.g., TETA and higher ethyleneamine homologs available as "B-AMINE 10A" from BOSSCO). Other examples of suitable types of polyamines include, but are not limited to, polyamines available from BASF CORPORATION.

Examples of suitable aromatic polyamines include, but are not limited to, compounds having the following structures (IIIA) and (IIIB), and those mixtures containing one or both of compounds (IIIA) and (IIIB):

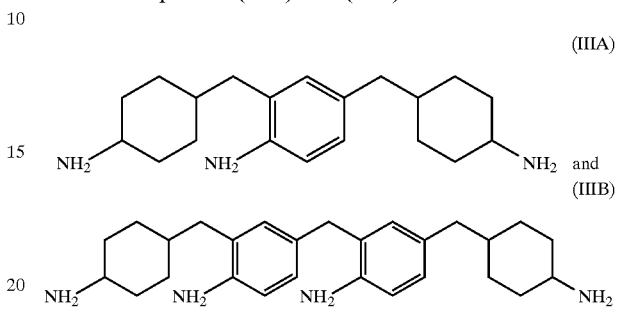

(IIIA)

and (IIIB)

One specific example of a mixture of suitable aromatic polyamines is mixed polycycloaliphatic amines ("MPCA") available from Air Products and Chemicals, Inc. of Allentown, Pa. "MPCA" contains a mixture of aminoalkylcyclohexylamines and aminoaralkylcyclohexylamines and in particular, from about 35% to about 50% of compound having structure (IIIA) and from about 3% to about 8% of compound having structure (IIIB). Among other compounds having at least three amine groups that are contained in "MPCA" are the cyclohexyl polyamine of structure (IIIC) (from about 15% to about 22%) and the cyclohexyl polyamine of structure (IIID) (from about 8% to about 20%), compounds which may be employed alone or in other mixtures as well:

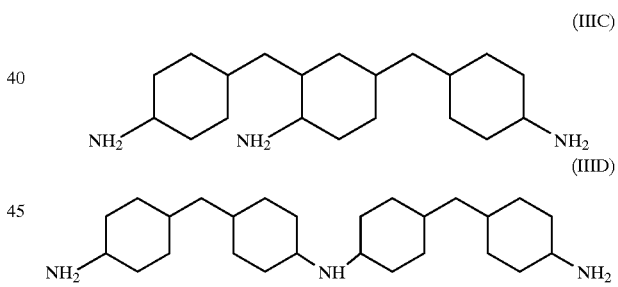

(IIIC)

(IIID)

In one embodiment, a tetrafunctional amine that may be reacted to leave behind two secondary amines after polymerization with a suitable polyacid may be employed. One example of such a polyamine is TETA having the following formula (IIIE):

$NH_2—(CH_2)_2—NH—(CH_2)_2—NH—(CH_2)_2—NH_2$ (IIIE)

To form a polyamide intermediate compound, reaction between one or more selected polyacids and one or more selected polyamines may be conducted in any reaction environment suitable for facilitating reaction between polyacid/s and polyamine/s and for removing water from the reactant mixture as it is formed from the reaction. With benefit of this disclosure, any suitable reaction technique known in the art for removing water during reaction may be employed including, but not limited to, atmospheric distillation, vacuum distillation, azeotropic distillation, nitrogen blanket sweep (e.g., continuously circulated nitrogen blanket within reaction vessel), etc. The reactants may be mechanically mixed or otherwise agitated, and then heated to facilitate polymerization. In this regard, particular reaction conditions (e.g., temperature, pressure, etc.), relative amounts of reactants and/or solvent, presence and amount of chain termination compounds (e.g., monofunctional amines and/or acids) may be varied by those of skill in the art with benefit of this disclosure based on the identity of the selected reactants and/or on the desired characteristics of the polyamide intermediate compound (molecular weight, molecular structure, etc.).

In one embodiment, to form a polyamide intermediate compound, reaction between one or more selected polyacids and one or more selected polyamines may be conducted in a reaction vessel in the presence of a solvent which is capable of azeotroping water (e.g., such as xylene, toluene, etc.) at the selected reaction temperature or temperature range to help remove water as it is formed from the reaction. Although any amount of such solvent suitable for facilitating reaction between selected polyacid/s and polyamine/s may be employed, in one exemplary embodiment the reaction may be carried out in the presence of sufficient solvent to result in from about 1% to about 25%, alternatively from about 10% to about 25%, and further alternatively from about 15% to about 25% solvent by weight of polyamide intermediate reaction product in the final reaction mixture. With benefit of this disclosure, those of skill in the art will understand that reaction temperature may be chosen based on the boiling point of the selected azeotropic mixture to be high enough to boil and remove water, and further selected to be below the temperature at which undesirable reaction products may occur. It will be further understood that dilution of reactants in solvent may be varied as desired to alter characteristics of the final reaction product.

In one exemplary embodiment, $C_{21}$ polyacid ("WESTVACO 1550") may be reacted with TETA at a polyacid-to-polyamine molar ratio of from about 0.8:1 to about 2:1, and alternatively at about 1:1, in a reaction vessel in the presence of xylene solvent. If so desired, such a reaction may be intentionally carried out using a polyacid-to-polyamine molar ratio of about 1:1 so as to promote polymerization, and in the presence of about 25% solvent by weight of resulting polyamide reaction product. The reaction may be carried out at a temperature of from about 130° C. to about 175° C. and at atmospheric pressure to obtain a polyamide intermediate compound having a relatively low molecular weight of from about 800 to about 5000 Atomic Mass Units ("AMU"), although polyamide intermediate compounds having greater and lesser molecular weights are also suitable for use in the methods and compositions described herein. For illustration purposes, this reaction is shown for the formation of three isomeric monomeric repeating units according to the reaction equation (IVA) below for "WESTVACO 1550" first isomer (IIA), with the reaction product comprising, for example, one of more of at least the three indicated monomeric units (it being understood that other isomers are also possible):

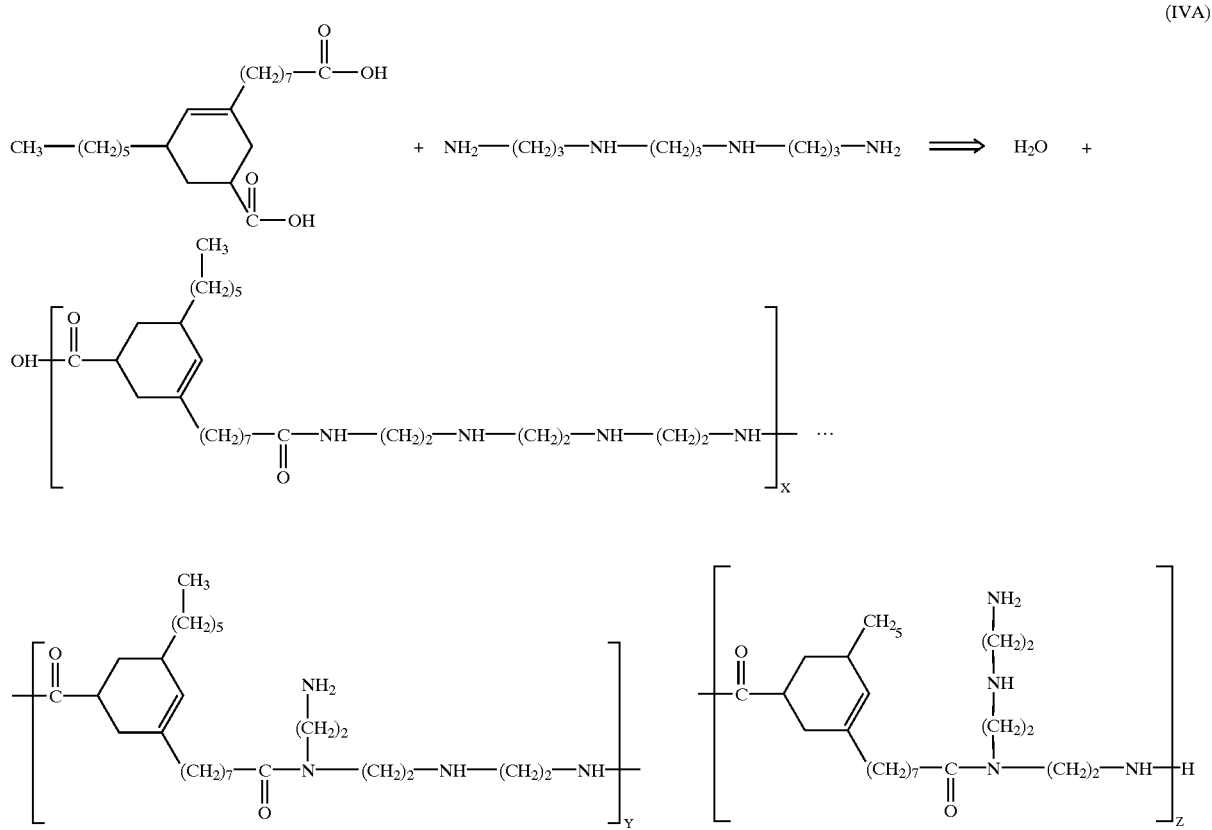

(IVA)

wherein in one embodiment: X, Y and Z represent the respective number of monomeric repeating units of each isomeric unit present in a given molecule so as to correspond to a particular AMU of the reaction product, depending on the reaction conditions used. In this regard, values of X, Y and Z may be sufficient such that X may represent from about 0% to about 100% of the total monomeric repeating units (i.e., total of X+Y+Z+ . . . ) present in the molecule; Y may represent from about 100% to about 0% of the total monomeric repeating units present in the molecule, and Z may represent from about 0% to about 100% of the total monomeric repeating units present in the molecule, with the possibility of other isomers being present in the molecule as well.

It will be understood that the respective monomeric repeating units corresponding to X, Y, Z, etc. may be randomly or systematically distributed within the molecule, or that only one of the monomeric units may be present in between "WESTVACO 1550" and TETA, with the exception that the reaction may be carried out at a temperature of from about 125° C. to about 185° C. to obtain a polyamide intermediate compound having a relatively low molecular weight of from about 500 to about 5000 AMU, although polyamide intermediate compounds having greater and lesser molecular weights are also suitable for use in the methods and compositions described herein. For illustration purposes, this reaction may proceed according to the reaction equation (IVB) below for "WESTVACO 1550" first isomer (IIA), with the reaction product comprising, for example, one of more of at least the two indicated monomeric units (it being understood that other isomers are also possible):

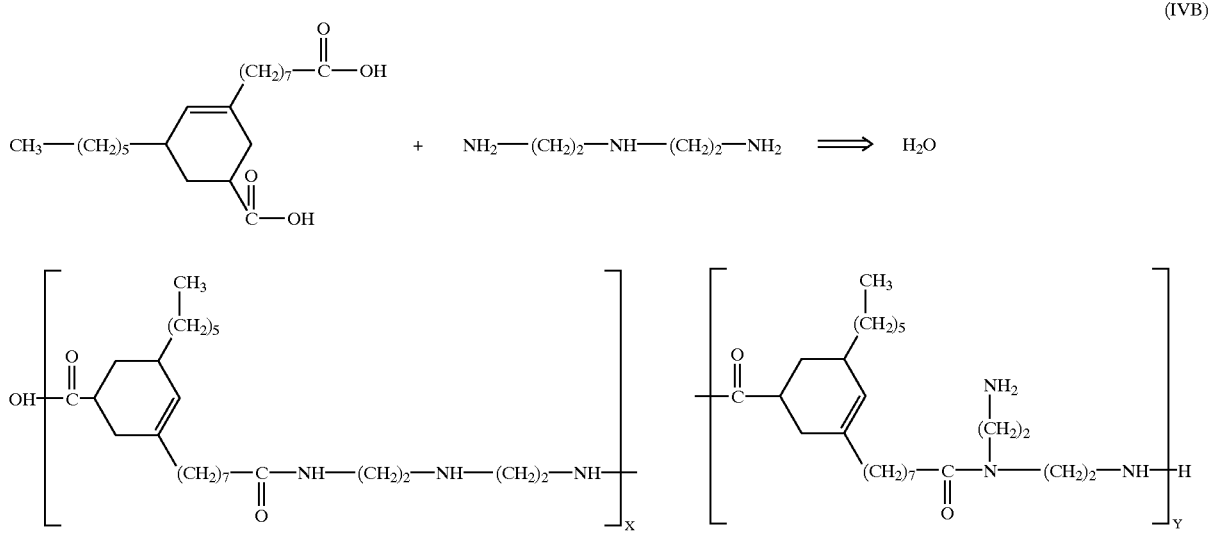

a given molecule. It will also be understood that mixtures of molecules having varying percentages of monomeric units corresponding to X, Y, Z, etc. are also possible. Furthermore, it will be understood that in one exemplary embodiment, similar isomeric monomeric repeating units corresponding to isomeric reaction products of "WESTVACO 1550" second isomer (IIB) and TETA (not shown) may be present in a given molecule along with or as an alternative to the monomeric repeating units of the reaction product shown in equation (IVA). In such a case, each of the isomeric monomeric repeating units derived from the first and second isomers of "WESTVACO 1550" may be present in respective amounts of from about 0% of the total monomeric repeating units present in the molecule to about 100% of the total monomeric repeating units in the molecule, with the proviso that the total of all monomeric units present in the molecule equal 100%, and that each of the isomeric monomeric units may be randomly or systematically distributed within the molecule in a manner as previously described with regard to other embodiments.

One example of a polyamide intermediate compound resulting from the reaction of "WESTVACO 1550" with TETA is available, for example, as "RM-115" from UNICHEM of BJ Services, and has an AMU of about 3,700.

In another exemplary embodiment, $C_{21}$ polyacid ("WESTVACO 1550") may be reacted with DETA using similar reaction conditions, molar ratio of reactants, solvent, reaction vessel, etc. as described above for the reaction wherein in one embodiment: X and Y represent the respective number of monomeric repeating units of each isomeric unit present in a given molecule so as to correspond to a particular AMU of the reaction product, depending on the reaction conditions used. In this regard, values of X and Y may be sufficient such that X may represent from about 0% to about 100% of the total monomeric repeating units (i.e., total of X+Y+ . . . ) present in the molecule; and Y may represent from about 100% to about 0% of the total monomeric repeating units present in the molecule, with the possibility of other isomers being present in the molecule as well.

It will be understood that the respective monomeric repeating units corresponding to X, Y, etc. may be randomly or systematically distributed within the molecule, or that only one of the monomeric units may be present in a given molecule. It will also be understood that mixtures of molecules having varying percentages of monomeric units corresponding to X, Y, etc. are also possible. Furthermore, it will be understood that in one exemplary embodiment, similar isomeric monomeric repeating units corresponding to isomeric reaction products of "WESTVACO 1550" second isomer (IIB) and DETA (not shown) may be present in a given molecule along with or as an alternative to the monomeric repeating units of the reaction product shown in equation (IVA). In such a case, each of the isomeric monomeric repeating units derived from the first and second isomers of "WESTVACO 1550" may be present in respective amounts of from about 0% of the total monomeric repeating units present in the molecule to about 100% of the total monomeric repeating units in the molecule, with the proviso that the total of all monomeric units present in the molecule equal 100%, and that each of the isomeric monomeric units may be randomly or systematically distributed within the molecule in a manner as previously described with regard to other embodiments.

One example of a polyamide intermediate compound resulting from the reaction of "WESTVACO 1550" with DETA is available, for example, as "RM-71" from UNICHEM of BJ Services.

triethoxysilane, gamma-isocyantopropyltriethoxysilane, 3-aminopropyltriethoxysilane, etc.

In this embodiment, one or more polyamide intermediate compounds may be reacted with one or more isocyano-functional silating compounds so that at least a portion of the secondary amine sites react with an isocyano group to form a silyl-modified polyamide, for example, according to the general reaction equation (V) below shown only for the reaction of polyamide intermediate first isomeric monomeric repeating unit of formula (1) with isocyano-functional silating compound to form a corresponding silyl-modified polyamide isomeric repeating unit as shown:

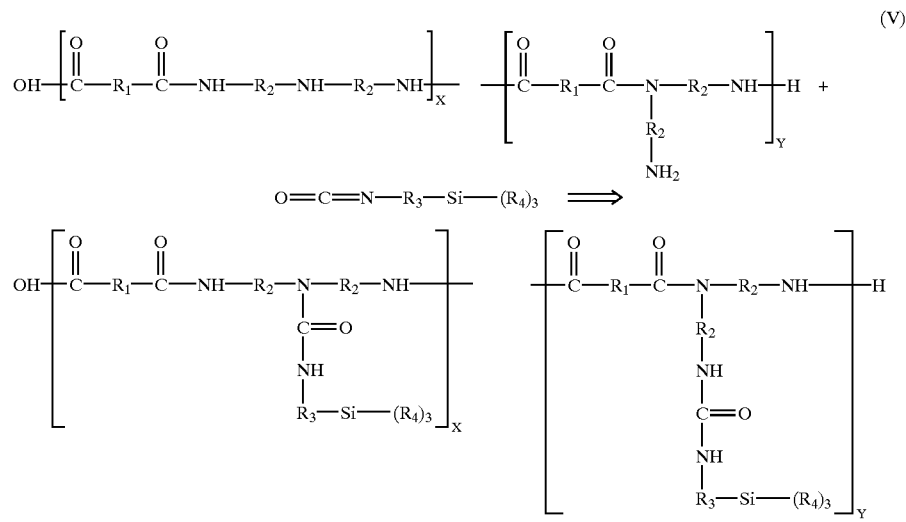

Other specific examples of polyamide intermediates include, but are not limited to, those available as the "VERSAMID" series from COGNIS (formerly HENKEL Coating and Inks Division), 300 Brookside So., Ambler, Pa., 19002-3498 (useful Versamid should be Versamid 115, 125, 140, 150). Exemplary suitable VERSAMID-series polyamide intermediates are "VERSAMID 115", "VERSAMID 125", "VERSAMID 140", and "VERSAMID 150", etc.

In the practice of the disclosed methods and compositions, a silating compound may be any alkoxysilane-based compound having at least one substituted reactive group capable of reacting and bonding with one or more primary or secondary amines or carboxylic acids, and one or more of the silicon atoms present in the molecule having one or more alkoxysilane functionalities. In one embodiment, a substituted reactive group may be an organic functional group having a terminal reactive isocyano functionality. Suitable isocyano-functional silating compounds include, but are not limited to, those having at least one isocyano-terminated functionality bonded to the silicon atom of the silane compound, and from about 1 to about 3 alkoxysilane functionalities extending from the remaining bonding sites of the silicon atom. Each alkoxysilane functionality may include a terminal alkyl chain of from about 1 to about 18 carbon atoms, alternatively from about 1 to about 3 carbon atoms each. Specific examples of such alkyl groups include, but are not limited to, ethyl groups, propyl groups, butyl groups, mixtures thereof, etc. Specific examples of isocyano-functional silating compounds include, but are not limited to, gamma-isocyantomethylwherein in one embodiment: $R_1$ may be a branched or straight chain alkyl-based group having from about 2 to about 54 carbon atoms, or cyclic group or alkyl-substituted cyclic group having from about 6 to about 54 carbon atoms; each $R_2$ may be independently a branched or straight chain alkyl-based group having from about 1 to about 6 carbon atoms, or alternatively may be R—NH—R, where each R may be independently a branched or straight chain alkyl-based group having from about 1 to about 6 carbon atoms, in which $R_3$ may be an alkyl-based group having from about 1 to about 18 carbon atoms, alternatively from about 1 to about 3 carbon atoms, in which each $R_4$ may be independently a branched or linear alkoxy group having from about 1 to about 3 carbon atoms, and wherein X and Y represent the respective number of monomeric repeating units of each isomeric unit present in a given molecule so as to correspond to a particular AMU of the reaction product. In this regard, values of X and Y may be sufficient such that X may represent from about 0% to about 100% of the total monomeric repeating units (i.e., total of X+Y) present in the molecule; and Y may represent from about 100% to about 0% of the total monomeric repeating units (X+Y) present in the molecule.

It will be understood that the above values of R, $R_1$, $R_2$, $R_3$, and $R_4$ given in relation to the embodiment of equation (V) are exemplary only, and that values outside these ranges are also possible. For example, $R_4$ may be branched or linear alkoxy group having 4 or more carbon atoms. It will also be understood that the respective monomeric repeating units corresponding to X and Y may be randomly or systematically distributed within the molecule, or that only one of the monomeric units may be present in a given molecule. Further, mixtures of molecules having varying percentages of monomeric units corresponding to X and Y are also possible. Further, it will be understood with benefit of this disclosure that the disclosed silyl-modified polyamides of formula (V) are also exemplary only, and that any reaction product of polyamide intermediate/s with isocyano-functional silating compound/s that is suitable for forming a silyl-modified polyamide possessing the characteristics disclosed elsewhere herein is also possible. Furthermore, it will be understood that the exemplary reaction schemes disclosed herein are for forming silyl-modified polyamides are exemplary only, and that any other suitable reaction scheme may be employed that is suitable for forming a silyl-modified polyamide possessing the characteristics disclosed elsewhere herein is also possible. For example, in another exemplary embodiment, aminoakylene alkoxysilanes may be condensed with polyfunctional carboxylic acids to form amide linkages to a polyamide resin. Such amines include, but are not limited to, gamma amino propyltriethoxysilane and polyamide that contain, in part, trimer acid.

Other examples of possible reaction mechanisms are given below:

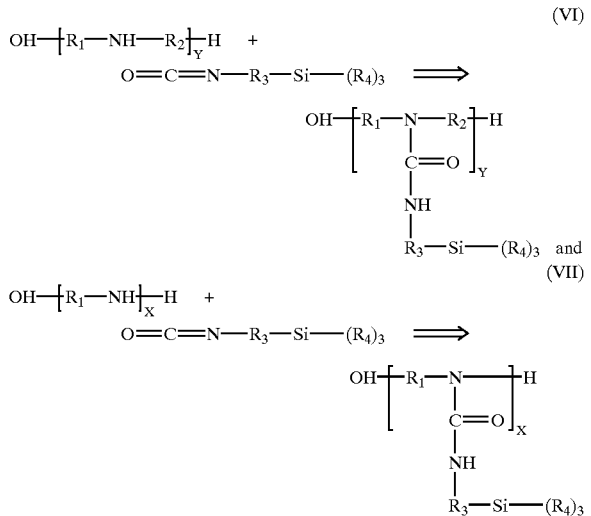

wherein: each $R_1$ may be independently any alky amine-functional group having a terminal polyacid-based functionality, including an alkyl amido-amine functional group; each $R_2$ may be independently any alky amine-functional group, including an alkyl amido-amine; each $R_3$ may be independently an alkyl-based group having from about 1 to about 18 carbon atoms, alternatively from about 1 to about 3 carbon atoms; each $R_4$ may be independently an alkoxy group having from about 1 to about 3 carbon atoms, although alkoxy groups having 4 or more carbon atoms are possible in other embodiments; and wherein X and Y represent the respective number of monomeric repeating units present in a given molecule so as to correspond to a particular AMU of the reaction product, it being understood that any one or more of groups $R_1$, $R_2$, $R_3$, and $R_4$ may have the same identity for each monomeric unit, or alternatively may vary in identity from individual monomeric unit to monomeric unit.

It has been found that the relative amount of isocyano-functional silating compound reacted with polyamide intermediate compound is related to the ultimate in situ compliance of a resulting silyl-modified polyamide. In this regard, the degree of compliance may affect the efficacy of a particular compound in reducing or substantially preventing movement of solid particulates or fines within a subterranean formation. Surprisingly and advantageously, such control of movement of solid particulates may be achieved with at least a partial coating of silyl-modified polyamide on at least a portion of the solid particulates without the need for exposure to, or reaction with, additional materials such as hardenable resins (e.g., epoxy or phenolic resins), quaternazation compounds (e.g., methylene chloride, dimethyl sulfate, benzylchloride, diethyl sulfate, etc.), multivalent ions, aldehydes, polyacids, halides, other crosslinking species, etc.

Although not wishing to be bound by theory it is believed that once the described silyl-modified polyamide compounds are exposed to a hydrolyzing agent, such as an aqueous-based carrier fluid, at least a portion of the organic functional alkoxysilane groups on the silane are hydrolyzed and replaced with terminal hydroxyl groups bonded to the silicon atom. It is believed that self-crosslinking characteristics exhibited by the disclosed compounds are caused by formation of intermolecular silicon-oxygen-silicon bonds between silane groups via condensation reaction at the point of these terminal hydroxyl groups. In this regard, crosslinking may be expected to begin occurring upon exposure to, or mixing with, aqueous-based fluids under room temperature conditions. It is also believed that silicon-oxygen-silicon bonds are responsible for superior characteristics of solids movement control exhibited by those disclosed compositions when used in combination with silica-based particulate solids and/or formation materials. In this regard, it is believed that the disclosed silyl-modified polyamide compositions react or interact with active silica sites on particulate solids and/or in the formation to form silicon-oxygen-silicon bonds that, for example, function to bond or substantially fix solid particulates to the formation and/or to each other.

It will be understood with benefit of this disclosure that depending on the desired compliance and/or bonding characteristics of the resulting silyl-modified polyamide, not all secondary amine sites need be reacted with isocyano-functional silating compound, and furthermore in some cases it may be desired that many secondary amine sites be left available for other reactions with the formation, such as initial adsorption onto particulates. In one embodiment, the fraction of available secondary amine sites that are reacted with isocyano-functional silating compound may be from about 1% to about 50% of secondary amine sites, alternatively from about 5% to about 20% secondary amine sites, and further alternatively from about 10% to about 15% secondary amine site, although fractions outside these ranges are also possible. It is also possible that in some cases, it may be desirable to minimize the amount of isocyano-functional silating compound employed so as to reduce costs associated with the formulation of silyl-modified polyamide.

With benefit of this disclosure, it will be understood by those of skill in the art that identity and relative amounts of isocyano-functional silating compound and polyamide intermediate reactants, as well as reaction conditions and/or other compounds present during reaction, may be varied to achieve desired properties of a resulting silyl-modified polyamide. These properties may be evaluated, for example, using methods disclosed herein in the examples, and/or using other evaluation methods known to those of skill in the art.

In one exemplary embodiment, an isocyano-functional silating compound may be gamma-isocyantopropyltri-ethoxysilane (available as "SILQUEST A-1310" from CK Witco):

O=C=N—(CH₂)₃—Si[O—CH₂—CH₃]₃ and may, for illustration purposes, be reacted with a polyamide intermediate such as the polyamide intermediate compound of formula (IVA) to yield a silyl modified polyamide having, for example, one or more of at least the five isomeric monomeric repeating units as follows (with a terminal hydroxyl bonded to the carbon of the terminal acyl group of each molecule, and a terminal hydrogen bonded to the terminal nitrogen atom of each molecule—not shown), it being understood that other isomers are also possible:

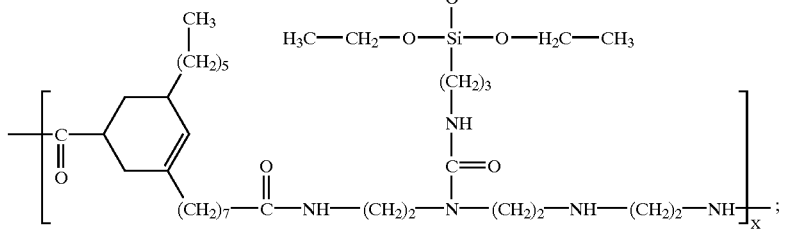

(VIIIA)

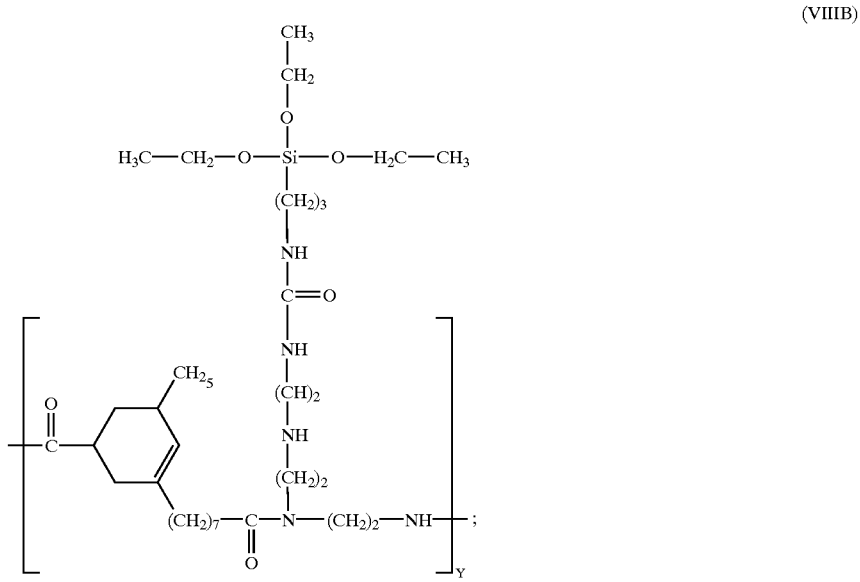

(VIIIB)

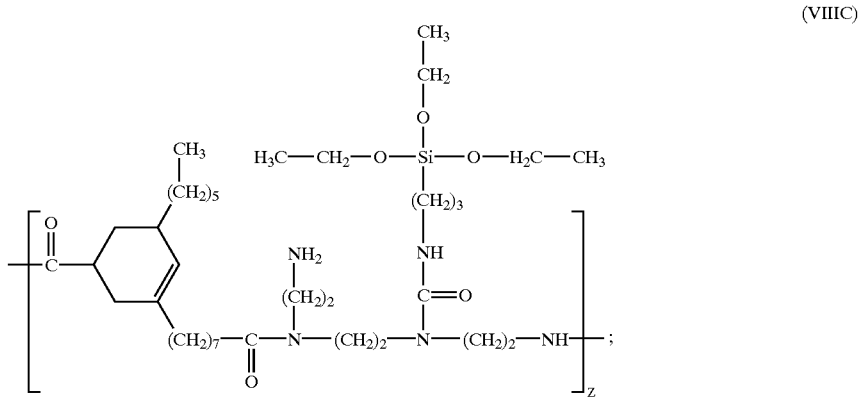

(VIIIC)

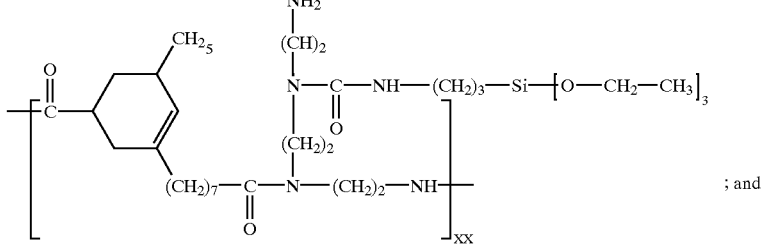

(VIIID)

; and

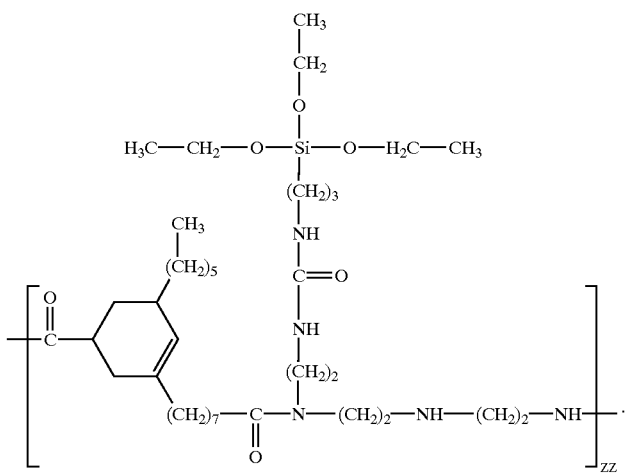

(VIIIE)

Although not shown, it will be understood that monomeric units may also, or alternatively, be present corresponding to a reaction between gamma-isocyantopropyltriethoxysilane and the polyamide intermediate reaction product of TETA and "WESTVACO 1550" second isomer (IIB), with any given monomeric unit being randomly or systematically distributed within the molecule and being present in an amount (respective number of units represented by X, Y, Z, XX, ZZ, etc.) of from about 0% to about 100% of the total monomeric repeating units present in a given molecule, so that the total amount of all monomeric repeating units present (number of units represented by the sum of X+Y+Z+XX+ . . . ) present in the molecule equal 100%.

This reaction may be carried out by combining polyamide intermediate with, for example, an amount of isocyano-functional silating sufficient to react with about 13% available secondary amine of the polyamide intermediate compound, resulting in a substantially non-compliant and relative hard ultimate in situ composition following introduction into a wellbore. Such a composition may be desirable for use, for example, in the treatment of high rate and high viscosity oil wells, where a relatively high resistance to fluid drag forces is desirable. On the other hand, the reaction may be carried out with substantially less isocyano reactive functionality by combining polyamide intermediate with, for example, an amount of isocyano-functional silating sufficient to react with about 5% available secondary amine of the polyamide intermediate compound, resulting in a relatively more compliant and less hard in situ composition following introduction into a wellbore. Such a more compliant and less brittle composition may be desirable for use in high cyclic stress environments, such as may be found in high rate gas wells, so that it is capable of resisting stress cycling with minimal shattering or breaking.

The above-described reaction may be carried out to yield a silyl-modified polyamide having an average molecular weight of from about 800 to about 5,000. However, it will be understood that compounds having greater and lesser molecular weights and/or greater or lesser degrees of substitution are also suitable for use in the methods and compositions described herein.

The above-described reaction between isocyano functional silating compound and polyamide intermediate may be carried out in the presence of a solvent under conditions of atmospheric pressure and at a temperature of from about 5° C. to about 40° C. However, any other combination of reaction media, temperature and/or pressure conditions suitable for allowing the reaction to proceed may be employed. In one exemplary embodiment, selected amounts of solvent, polyamide intermediate compound, and isocyano functional silating compound may be combined in an open tank and agitated, for example, using an air wand, stirrer, or other agitation device. The reaction may be carried out at plant site remote from the field and the silyl-modified polyamide product transported to the field for use. Such plant-synthesized products may be prepared, for example, from amounts of reactants to have predetermined characteristics of in situ compliance and relative hardness. Alternatively, the reaction may be carried out in the field, for example, at a base camp, or even at a well site. When carried out in the field, the ultimate in situ compliance of a silyl-modified polyamide may advantageously be modified in the field to suit particular wellbore conditions or other criteria by, for example, varying the relative amounts of reactants to obtain a customized product during application.

Solvents that may be employed include any solvent in which the reactants are substantially soluble and that is substantially unreactive with the isocyano functional silating compound. Examples include, but are not limited to, aromatics, lactones, cyclic ethers, carbonates, etc. Specific examples of suitable solvents for use in reacting isocyano functional silating compound/s with polyamide intermediate compound/s include, but are not limited to, N-methyl-2-pyrolidone, xylene, propylene carbonate, mixtures thereof, etc. Mixtures of solvents may be employed, for example, to reduce the overall solvent system cost. In one embodiment, a solvent system may comprise about 67% by weight xylene and about 33% by weight methyl-2-pyrrolidone.

In one embodiment, a selected solvent or mixture of solvents may first be combined with polyamide intermediate compound to form a mixture containing solvent/s in an amount of from about 95% by weight to about 50% by weight, alternatively about 75% by weight of total weight of mixture, with the balance being polyamide intermediate compound. Selected amount of isocyano-functional silating compound may then be added to the solvent/polyamide intermediate mixture, for example, in an amount based on the weight of polyamide intermediate present as described elsewhere herein. In one embodiment, it is desirable that the reaction be carried out in the substantial absence of water, alcohol or other compound/s capable of reacting with the isocyano functional silating compound. Furthermore, following reaction it may be desirable to prevent contact with hydrolyzing agent such as water where the resulting silyl-modified polyamide product is to remain substantially non-crosslinked until ready for use, for example, as introduced into a wellbore, or mixed with sand to be introduced into a wellbore.

In another exemplary embodiment, an isocyano-functional silating compound may be gamma-isocyantopropyltriethoxysilane (available as "SILQUEST A-1310" from CK Witco) may, for illustration purposes, be reacted with a polyamide intermediate such as the polyamide intermediate isomer compound of formula (IVB). This reaction may proceed with similar reaction conditions and in a manner to yield a compound having one or more of at least the two isomeric monomeric repeating units as follows, it being understood that other isomers are also possible:

1550" second isomer (IIB), with any given monomeric unit being randomly or systematically distributed within the molecule and being present in an amount (respective number of units represented by X, Y, etc.) of from about 0% to about 100% of the total monomeric repeating units present in a given molecule, so that the total amount of all monomeric repeating units present (number of units represented by the sum of X+Y+ . . . ) present in the molecule equal 100%.

In one embodiment, the disclosed silyl-modified polyamides may be employed to consolidate or otherwise reduce or substantially prevent movement of introduced particulate solids within a formation and/or wellbore during fluid flow into and/or out of the formation. In this regard, the disclosed compounds may be advantageously employed to control movement of any type of particulate solid that is introducable into a wellbore and/or formation, including those particulates that are introducable to form packs within a formation and/or wellbore, and which are chemically compatible with the disclosed compositions. Examples of such introducable particulate solids include, but are not limited to, fracture proppant materials introducable into the formation as part of a hydraulic fracture treatment, sand control particulate introducable into the wellbore/formation as part of a sand control treatment such as a gravel pack or frac pack, etc. Specific examples of such particulate solids include, but are not limited to, particles comprised of silica (such as Ottawa, Brady or Colorado Sands), synthetic organic particles, glass microspheres, ceramics (including aluminosilicates such as "CARBOLITE," "NAPLITE" or "ECONOPROP"), resin-coated sand (such as "ACME BORDEN PR 6000" or "SANTROL TEMPERED HS"), sintered bauxite, natural organic particles (such as ground or crushed nut shells, ground or crushed seed shells, ground or crushed fruit pits, processed wood, etc.).

Other examples of particulate solids include, but are not limited to, those particles available from BJ SERVICES having the tradename "FLEXSAND™", "FLEXSAND™ LS", "FLEXSAND™MS" etc. Further information on these and other particles may be found in U.S. provisional patent

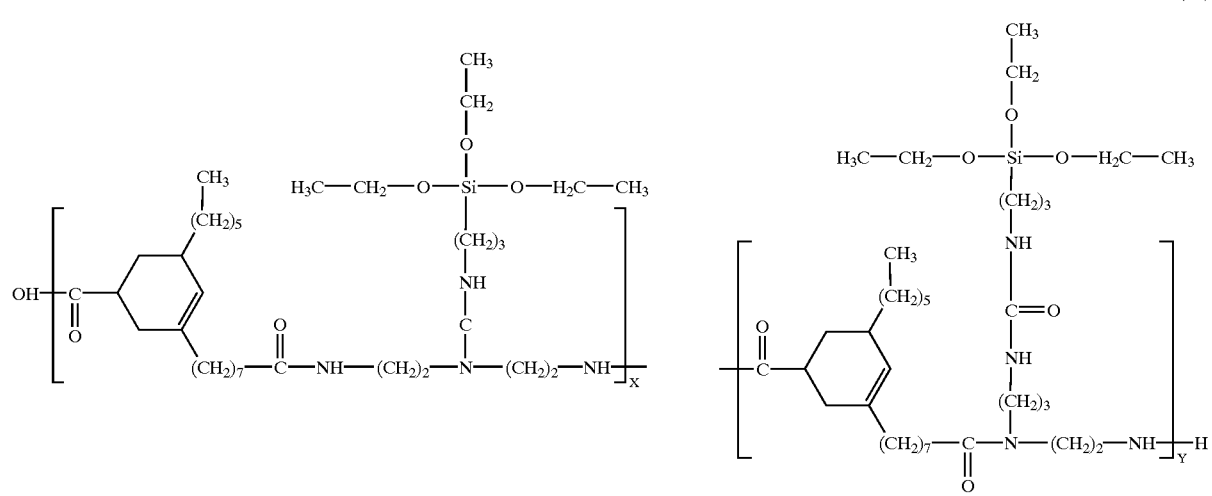

(XI)

Although not shown, it will be understood that monomeric units may also, or alternatively, be present corresponding to a reaction between gamma-isocyantopropyltriethoxysilane and the polyamide intermediate reaction product of DETA and "WESTVACO application serial No. 60/154,251 filed on Sep. 16, 1999; and in U.S. patent application Ser. No. 09/662,074 filed Sep. 14, 2000; each of which is incorporated herein by reference.

Additional information on materials and particulate solids that are introducable into a wellbore in conjunction with the disclosed methods and compositions, as well as methods of introducing such solid particulates into a wellbore or formation for purposes of hydraulic fracturing and/or sand control may be found in, for example, European Patent Application EP 0 771 935 A1; in U.S. Pat. Nos. 4,869,960; 4,664,819; 4,518,039; 3,929,191; 3,659,651; 5,422,183; 4,969,523; 5,492,178; 6,059,034; and in U.S. patent application Ser. No. 09/519,238 filed Mar. 6, 2000 and entitled "FORMATION TREATMENT METHOD USING DEFORMABLE PARTICLES"; U.S. patent application Ser. No. 09/579,146 filed May 25, 2000 and entitled Patent Application entitled "LIGHTWEIGHT METHODS AND COMPOSITIONS FOR SAND CONTROL"; U.S. patent application Ser. No. 09/579,147 filed May 25, 2000 and entitled "LIGHTWEIGHT METHODS AND COMPOSITIONS FOR WELL TREATING"; each of the foregoing being incorporated herein by reference. Several of these references also describe deformable particulate materials (including multiple component deformable materials) or lightweight particulate materials (including coated lightweight particulate materials) that may be employed, for example, in a mixture with solid particulates described elsewhere herein that are at least partially coated or otherwise adhered to with the disclosed silyl-modified polyamides. Furthermore, the disclosed silyl-modified polyamides may be employed to at least partially coat one or more of these deformable and/or lightweight materials (e.g., aluminum particles), in manners described elsewhere herein for solid particulates. In this regard, the disclosed silyl-modified polyamides may be employed to at least partially coat such particles (or one or more components of such particles) in the presence or absence of underlying coatings of other materials described in the references listed above.

Introduced particulate solids typically have overall dimensions that are substantially larger than the pore throats of a formation. However, movement of introduced particulate solids that may be small enough in overall dimension to fit into, plug, flow through, or otherwise interrelate with pore throats of the formation matrix within the subterranean formation may also be controlled using the disclosed compositions and methods. Including among such smaller introduced particles are those that may be characterized as fines generated from crushed fracture proppant and/or from the formation.

The disclosed silyl-modified polyamides may also be employed to reduce or substantially prevent movement of naturally occurring or pre-existing particulate solids within a formation and/or wellbore during fluid flow into and/or out of the formation. Such particulates include, but are not limited to, unconsolidated reservoir materials (e.g., formation sand) that may, for example, flow into and partially fill a wellbore during production, and/or naturally occurring formation fines that may adversely affect formation productivity in a manner similar to that encountered with introduced particulate solid fines. In some cases, control of the movement of both introduced and naturally occurring particulate solids may be effected, and advantageously the movement of either types of particulate solids may be controlled with little or substantially no reduction in reservoir formation productivity, as compared to natural formation productivity prior to the treatment and in the absence of adverse effects of particulate solids.

The disclosed silyl-modified polyamides may be employed to control the movement of particulate solids in any manner suitable for contacting and at least partially coating or adhering silyl-modified polyamide to at least a portion of the particulate solids present within a formation and/or wellbore. In this regard, an effective amount of the material may be applied as a coating or partial coating on particulate solids (e.g. fracture proppant, sand control particulate, etc.) prior to introduction of the particulate solids into a wellbore and/or formation (e.g, onsite such as at the wellsite). Alternatively, an effective amount of silyl-modified polyamide may be introduced in a mixture (as a liquid or solid, e.g., suspension of particulate solids with liquid silyl-modified polyamide and/or suspension of particulate solids and silyl-modified polyamide solids) with particulate solids as they are introduced into a wellbore and/or formation as part of, for example, a well treatment such as a hydraulic fracture treatment, gravel pack (with gravel pack screen), frac pack, sand consolidation treatment (e.g., in the absence of a gravel pack screen), etc. Such well treatment fluids may be introduced above or below the fracturing pressure of the formation, as appropriate for the selected treatment type. Further alternatively, an effective amount of silyl-modified polyamide may be introduced for particulate consolidation purposes in liquid and/or solid form (and in the substantial absence of particulates) so as to contact naturally occurring particulate solids (such as unconsolidated formation material) and/or particulate solids that have been previously introduced as part of a well treatment. It will be understood with benefit of this disclosure that where a solid or paste-like silyl-modified polyamide is added to an introducable solid particulate prior to introduction to the wellbore, it may be selected to exist as a liquid or in other form suitable for at least partially adhering to the solid particulate at downhole conditions of temperature and/or pressure.

In any case, when at least partially coating and or otherwise adhering to individual or agglomerated groups of particulate solids, an effective amount of silyl-modified polyamide may advantageously be employed to reduce or substantially prevent the movement of introduced and/or naturally occurring particulate solids through the formation and/or wellbore during fluid flow into the wellbore from the formation and/or out of the wellbore into the formation. Surprisingly and unexpectedly, when used instead of conventional epoxide or furan resins (e.g., for screenless sand consolidation treatments), the disclosed silyl-modified polyamides may contact and consolidate solid particulate matter in the wellbore and/or formation without the typical reduction in permeability or conductivity typically caused by exposure of a pack or formation to conventional resins.

With benefit of this disclosure, it will be understood that particulate solid may be combined with silyl-modified polyamide for use in a well treatment fluid, such as any aqueous-based or organic-based well treatment fluid suitable for introducing a slurry or suspension of the solid particulates into the wellbore. Such fluids include those known in the art for introducing particulate solids into a wellbore and/or formation (e.g., hydraulic fracturing fluids, gravel pack fluids, frac pack fluids, foamed fluids, fluids viscosified with viscosifying agent, emulsified fluids, etc.), and may also include other additives known in the art of well treating such as surfactants, breakers, clay stabilizers, friction reducers, buffers, etc. It will be understood with benefit of this disclosure that volume of treatment fluid, amount of solid particulates (e.g., sand control particulate, proppant, etc.), amount of other additives, etc. may be selected based on well treating conditions and job design parameters using methods known in the art. Furthermore, injection rates and pressures may be below, at, or above the formation fracturing pressure, and may be so chosen by those of skill in the art to fit the particular purposes of the well treatment.

In one exemplary embodiment, a silyl-modified polyamide may be combined with other components of a well treatment fluid, such as an aqueous carrier fluid (e.g., fresh water, brine, $CaCl_2$ water, KCl water, sea water, formation water, etc.) containing solid particulate material (e.g., hydraulic fracture proppant, sand control particulate, etc.), optional gellants, etc. A well treatment fluid may be combined with particulate solid and introduced into a wellbore in any suitable manner described herein. It will be understood with benefit of this disclosure that such particulate-containing well treatment fluids with which the disclosed silyl-modified polyamide may be advantageously combined include those that may be formulated using materials and methods known in the art. Although not a limiting factor the carrier fluid may have a pH of from about 3 to about 12, corresponding to the typical pH of a well treatment fluid such as a hydraulic fracturing fluid.

When introduced into a wellbore in combination with particulate solids (e.g., hydraulic fracture proppant, sand control particulate, etc.), a silyl-modified polyamide may be blended or otherwise mixed at the wellsite with the particulate solids at any point and using any mixing method suitable for intermixing the silyl-modified polyamide with the particulate solids, before, after or simultaneously with combination with a carrier fluid. For example, a silyl-modified polyamide having the form of a liquid or solid at surface mixing conditions may be added at, or introduced into, any point or location in a well treatment fluid process stream that is suitable for allowing the silyl-modified polyamide to contact and at least partially coat or otherwise adhere to at least a portion of the particulate solids including, but not limited to, within a blender tub as well as before or after the blender as so desired. Such locations include prior to, at the same time, or after introduction of a introducable particulate solid into the process stream. However, in some cases the location for addition of silyl-modified polyamide may be dictated by other chemical components or equipment used in a well treatment. For example, where polysaccharide viscosifiers are employed in a well treatment fluid it may be desirable to mix or otherwise combine and contact a silyl-modified polyamide compound with the particulate solid prior to (or at least simultaneously with) combination of the viscosifier with the particulate in order to ensure that the silyl-modified polyamide has an opportunity to at least partially coat the particulate material without interference from the viscosifier material.

When combined with a particulate solid in a well treatment fluid prior to introduction into a wellbore, any amount of silyl-modified polyamide relative to solid particulate may be employed that is effective to at least partially coat or otherwise adhere to a portion of the solid particulate material so movement of at least a portion of the solid particulate is reduced or substantially prevented once in the formation and/or wellbore. In one embodiment, from about 1 pound to about 20 pounds (alternatively about 5 pounds) of silyl modified polyamide resin may be combined with each 1000 pounds of proppant present within the aqueous carrier fluid (or from about 0.1% to about 2% by weight, alternatively about 0.5% by weight, of silyl modified polyamide resin per total weight of proppant present within the aqueous carrier fluid), although greater or lesser amounts of silyl modified polyamide may be employed. Once combined with an aqueous fluid, it is believed that the disclosed silyl-modified polyamide compound will preferentially "plate out" on or otherwise act to coat or adhere to individual solid particulates, with or without the presence of surfactants. However, although not necessary, an optional surfactant may be present in the solution in an amount of from greater than about 0% to about 1% by weight of total treatment fluid. Such a surfactant may be optionally present to facilitate coating of solid particulates with the silyl-modified polyamide and improve dispersion of the silyl modified polyamide. In this regard, any surfactant suitable for improving wettability or coat-ability of solid particulates with silyl-modified polyamide may be employed. Although any surfactant suitable for improving wettability or coat-ability of the solid particulates with silyl-modified polyamide may be employed, it may be desirable to avoid oxygenated surfactants as they may participate in undesirable reactions with alkoxysilane functionalities. Specific examples of suitable optional surfactants include, but are not limited to n-octyl pyrrolidone, capped polyethylene oxide based surfactants, capped polypropylene oxide based surfactants, amides and imidazolenes, mixtures thereof etc.

When combined with a particulate solid prior to combination with other components of a carrier fluid and introduction into a wellbore, any amount of silyl-modified polyamide relative to solid particulate may be employed that is effective to at least partially coat or otherwise adhere to a portion of the solid particulate material so movement of at least a portion of the solid particulate is reduced or substantially prevented once in the formation and/or wellbore. In one exemplary embodiment, silyl-modified polyamide resin may be applied to or combined with (e.g., sprayed onto, mixed with, etc.) a particulate solid in an amount corresponding to from about 1 pound to about 20 pounds (alternatively about 5 pounds) of silyl modified polyamide resin to each 1000 pounds of proppant (or from about 0.1% to about 2% by weight, alternatively about 0.5% by weight, of silyl modified polyamide resin by total weight of the particulate solid), although greater or lesser amounts are also possible. In one exemplary embodiment for onsite application of silyl-modified polyamide to particulate solids, the silyl modified polyamide resin or dilute solution of silyl modified polyamide resin may be sprayed onto a particulate solid using a spray nozzle positioned at the top of the sand screws just prior to the blender tub. In this embodiment, the nozzle may be positioned so that the particulate solid contacts the spray as it falls into the blender tub.

In another embodiment, one or more silyl-modified polyamides may be introduced as part of a well treatment fluid containing substantially no particulate solids, e.g., to control movement of particulate solids that are pre-existing in the wellbore and/or subterranean formation. Since the solid particulates to be treated are pre-existing, such a well treatment fluid may contain substantially no particulate solids (e.g. proppant, sand control particulates, etc.) for introduction into the wellbore. Examples of pre-existing particulate solids that may be so treated include, but are not limited to, introduced particulate solids present from previous hydraulic fracture treatments or from previously performed sand control treatments, and/or naturally occurring particulate solids such as unconsolidated formation materials and fines. In one exemplary embodiment, such a treatment fluid may include one or more silyl-modified polyamides present in a carrier fluid that may be any aqueous-based carrier fluid suitable for transporting the silyl-modified polyamides into the wellbore and/or formation in a desirable concentration for treatment of the particulate solids. The disclosed silyl-modified polyamides may function to control movement of pre-existing particulate solids by, for example, at least partially consolidating at least a portion of the pre-existing particulate solids in the wellbore and/or formation.

When introduced as part of a well treatment fluid to control movement of pre-existing particulate solids, silyl-modified polyamide may be present in the carrier fluid in any amount capable of forming a well treatment fluid capable of displacement into the wellbore and/or formation, and that is effective to contact and reduce or substantially prevent the movement of introduced or naturally occurring particulate solids through the formation or wellbore during fluid flow into the wellbore from the formation and/or out of the wellbore into the formation. In one exemplary embodiment, silyl-modified polyamide may be present in a carrier fluid that contains substantially no particulate solids in an amount of from about 0.5% to about 10% by weight of total weight of treatment fluid to be introduced, although greater or lesser amounts of silyl-modified polyamide may be employed. Optional additives may also be present in such a well treatment fluid, including surfactants and other additives in amounts mentioned elsewhere herein.

A well treatment fluid may be introduced to at least partially contact and control movement of pre-existing particulate solids that exist within the wellbore and/or the formation. In this regard, with benefit of this disclosure those of skill in the art will understand that the volume of such a treatment fluid may be determined to achieve the desired result (e.g., relatively smaller volume and displacement of well treatment fluids for controlling movement of pre-existing particulate solids within the wellbore, compared to relatively larger volumes and displacement of well treatment fluids for controlling movement of pre-existing particulate solids in the formation). A well treatment fluid introduced to control movement of pre-existing solids may be introduced below, at or above the fracturing pressure, as so desired. However, to maximize contact of solid particulates and to minimize production of additional fines, in many cases it may be desirable to introduce well treatment fluids to control movement of pre-existing solid particulates (e.g., sand control particulate, fracture proppant, unconsolidated formation materials, formation fines, etc.) at a pressure and rate that is below the fracturing pressure of the formation, i.e., at a matrix injection rate.

The disclosed silyl-modified polyamide compositions may be particularly useful when introduced as part of a well treatment into a coal seam or coal-bearing formation, such as may be penetrated by a coalbed methane well. In this regard, it has been found that exposure of these compositions to coal in the formation surprisingly and advantageously enhances de-watering and/or desorption of gas from coal seams and coal-bearing formations. Furthermore, the disclosed silyl-modified polyamides may be utilized to minimize coal fines generation that may result from "spalling" caused by embedment of hydraulic fracture proppant into the exposed face of the coal formation, and to minimize movement of any coal fines present by adhering to or otherwise retaining the fines. It will be understood with benefit of this disclosure that such advantages may be realized in any type of hydrocarbon production and/or mining scheme in which coal is dewatered and degassed. In one example, silyl-modified polyamide compound may be introduced as part of a hydraulic fracturing treatment fluid introduced into a coal seam or coal-bearing formation through a coalbed methane well, using methodology and amounts described elsewhere herein for hydraulic fracturing treatments. Alternatively, the silyl modified polyamide may be combined with a carrier fluid in a manner such as described elsewhere herein and introduced into a coal seam or coal-bearing formation directly, without introducable solid particulates.

Whether introduced in a well treatment fluid containing a slurry or suspension of particulate solids, or in a well treatment fluid solution containing substantially no particulate solids, a silyl-modified polyamide may be present in the entire well treatment volume, or alternatively, only present in a portion of the well treatment volume (e.g., the initial stages of the treatment, the final stages of the treatment, or in the middle of the treatment). It may be desirable in some cases to introduce particulate solids that are at least partially coated with silyl-modified polyamide in at least the final stages of a well treatment (e.g., the final third of the treatment volume), so that this particulate material is placed or is present in the wellbore and/or near-wellbore area, forming a zone of particulate solid materials that resist movement near the wellbore and in doing so, enhancing the proppant flowback control of the treatment. Furthermore, concentration and type of silyl-modified polyamide, as well as concentration and type of particulate solid may be varied throughout a particular well treatment operation.

In one embodiment, the self-hardening nature of silyl-modified polyamide compound that is contained within an aqueous-based well treatment fluid may be adjusted or controlled so as to occur after a period of time that is sufficient to allow placement of the silyl-modified compound into a wellbore and/or subterranean formation at downhole pumping temperatures. This may be desirable, for example, to reduce the effect of tubular shear on the structure of the self-hardening compound, and so that the polyamide compound is given opportunity to adhere to downhole particulates prior to self-hardening. With benefit of this disclosure, those of skill in the art will understand that self-hardening time may be adjusted by varying the percentage of secondary amine sites that are silated in the silyl-modified polyamide compound, and/or by adjusting the pH of the aqueous-based well treatment fluid (i.e., higher pH fluid accelerates the self-hardening reaction). To obtain desired self-hardening characteristics, such parameters may be varied and the resulting compounds evaluated at anticipated formation conditions using the information disclosed herein coupled with evaluation methods known to those of skill in the art. Evaluation methods which may be employed include, for example, evaluation methods described elsewhere herein.

EXAMPLES

The following examples are illustrative and should not be construed as limiting the scope of the invention or claims thereof In the following examples, flowback tests were used to analyze the ability of a proppant to remain in a pack as fluid was flowed through the pack, exerting force on the individual particles and tending to destabilize the pack. Flowback tests were performed using the test cell apparatus 100 illustrated in FIG. 1. The flowback tests were performed by placing a sample of proppant as a gel slurry pack 110 into sample cavity 102 of a standard API (American Petroleum Institute) conductivity test cell 100 between natural Ohio sandstone core wafer slabs 112 and 114. Proppant used for the tests of these examples was 20/40 US Mesh Ottawa sand.

A test fluid (liquid or gas) was then introduced into inlet 116 in the test cell body 108 and flowed through the proppant pack 110. Test cell 100 was equipped with a slot flow outlet end 118 which allowed the proppant to freely exit the cell when sufficient pressure was placed on the individual proppant grains within the proppant pack 110 to cause pack failure. Differential pressure sensing ports 106 were present to measure differential pressure across the pack during fluid flow. Upper and lower pistons 120 and 122 were provided to exert closure stress on pack 110, and to measure any decrease in the width of pack 110 during the flow test. Leak-off outlet ports 104 were present in lower piston 122 for the purpose of concentrating test fluids but were not used in this test series.

Data was recorded during the flowback tests, and included measurement of the flow rate of the test fluid, the differential pressure of the flow through the proppant pack 110, temperature of the proppant pack 110, and the width of the proppant pack 110. Flow was accomplished by using a pump to flow deionized water through the pack 110 at increasing pump rates until proppant pack 110 failed and proppant exited the cell at outlet 118. Failure of the proppant pack 110 was indicated by rapidly decreasing pack width and differential pressure.

Comparative Example A—Untreated Ottawa Sand Proppant

A baseline comparative test was conducted by placing 63 grams of untreated 20/40 US Mesh Ottawa sand as a proppant pack 110 into sample cavity 102 of conductivity cell 100, between Ohio sandstone wafers 112 and 114. This comparative test was conducted to determine the flow rate and differential pressure values at which the untreated proppant pack fails and begins to flow.

Figure 2:
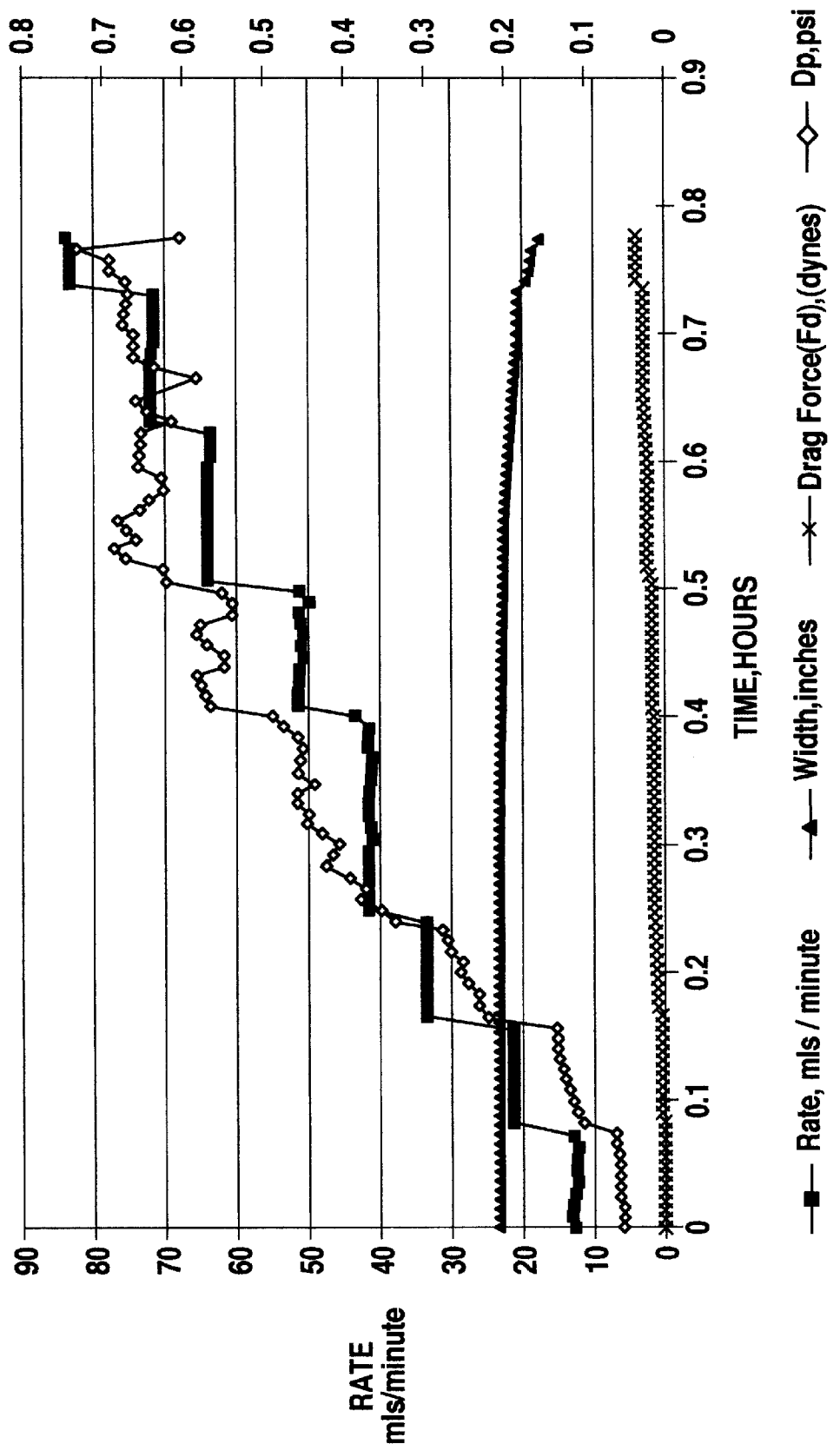
FIG. 2 shows values of flow rate, pack width, differential pressure, and Drag Force plotted versus time for Comparative Example A.

FIG. 2 shows measured values of flow rate, pack width, and differential pressure plotted versus time for this comparative example. Also plotted versus time is Drag Force ("Td") on an individual grain of proppant in pack 110 of this example. Fd was calculated in units of dynes from the collected data, and represents the force exerted on an individual grain of proppant in pack 110. From this data, the Drag Force at which the proppant pack first fails may be determined and graphed with the rate where the initial flowback of proppant occurred. As may be seen in FIG. 2, pack failure for this example initializes at 60 mls/minute with a corresponding Fd of 0.07 dynes, Multiple tests (not shown) have shown that the flow rate range at which untreated 20/40 US Mesh Ottawa sand proppant fails is typically between 40 to 80 mls/minute.

Example 1—Preparation of UNICHEM "RM-71"

88.4 grams of WESTVACO 1550 dimer acid was reacted with 26.7 grams of diethylene triamine ("DETA") in the presence of 10 ml xylene to form "RM-71". The reaction was carried out over a 6 hour period, starting to reflux at 129° C. and ending at 185° C. 9.0 ml of water was refluxed off.

Example 2—Preparation of UNICHEM "RM-115"

442 grams of WESTVACO 1550 dimer acid was reacted with 133.5 grams of triethylene tetraamine ("TETA") in the presence of 200 ml xylene to form "RM-115". The reaction was carried out over a 6½ hour period, starting to reflux at 140° C. and ending at 173° C. 45 ml of water was refluxed off.

Example 3—Preparation of JCD215-44a Silyl Modified Polyamide*

Using a 200 ml beaker, 15.0 grams of UNICHEM "RM 71" polyamide resin was heated to 70° C. and then poured into 30 grams of N-methyl pyrolidone from BASF. The resulting mixture was stirred until uniform. Then 0.75 grams of "SILQUEST A1310" from OSI SPECIALTIES was added and stirred for 30 minutes. Lastly, 4.25 grams of an N-dodecyl pyrolidone surfactant ("SURFADONE LP-300" from ISP TECHNOLOGIES, INC.), was added and stirred until uniform.

*—Analysis of previous mixtures of the reactants of this embodiment have indicated that the isocyanate peak in the IR disappeared within about 5 minutes, suggesting that for the mixtures of this embodiment the grafting of silane to the polyamide is substantially complete within that time.

Figure 3:
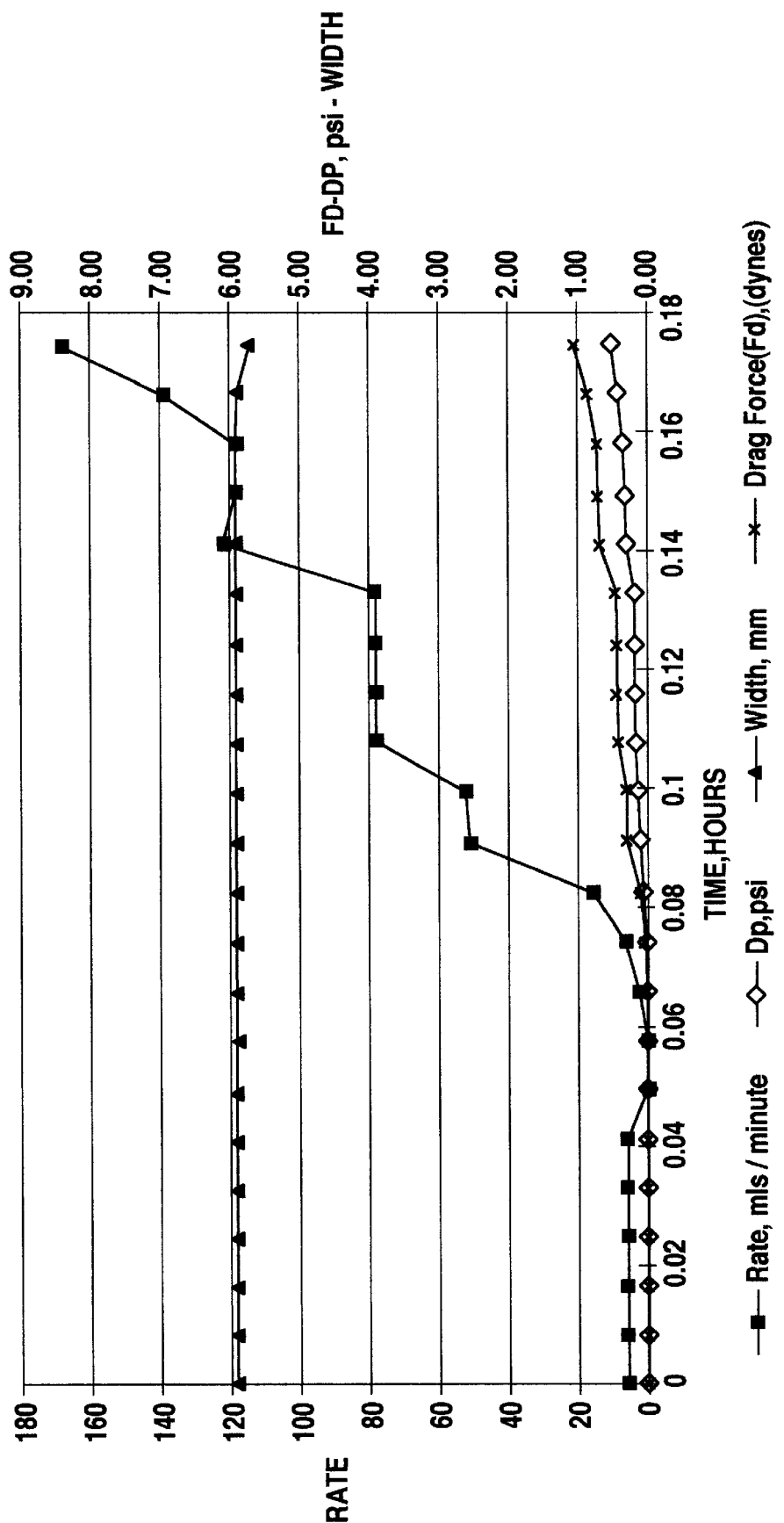
FIG. 3 shows values of flow rate, pack width, differential pressure, and Drag Force plotted versus time according to one embodiment of the disclosed method tested in Example 4.

Example 4—Flowback Analysis of Treated Ottawa Sand 63-grams of 20/40 US Mesh Ottawa sand proppant was treated with JCD-215-44A silyl modified polyamide of Example 3 by placing it in a beaker with 2% KCl water and adding 1% by weight per total weight of proppant of the JCD-2144A test material and stirring. The proppant was then added to the conductivity cell and tested in the same manner as for Comparative Example A. FIG. 3 shows measured values of flow rate, pack width, and differential pressure, and calculated value of Drag Force, plotted versus time. FIG. 3 shows that the rate necessary to destabilize the pack of treated Ottawa sand is 168 mls/minute at a corresponding Fd of 1.68 dynes.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed compositions and methods may be utilized in various combinations and/or independently. Thus the invention is not limited to only those combinations shown herein, but rather may include other combinations. Furthermore, it will be understood that as used herein, the indefinite articles "a" and "an" connote "one or more."

What is claimed is:

1. A well treatment method, comprising introducing a well treatment fluid into a wellbore penetrating a subterranean formation, said well treatment fluid comprising a silyl-modified polyamide compound.

2. The method of claim 1, wherein said silyl-modified polyamide compound is substantially self-hardening.

3. The method of claim 2, wherein said well treatment fluid comprises introducable particulate material suspended within said well treatment fluid, said introducable particulate material being at least partially coated with said silyl-modified polyamide in an amount effective to reduce or substantially prevent movement of at least a portion of the individual particles of said introducable particulate material when said particulates are subjected to fluid flow within said wellbore or subterranean formation; and wherein said method further comprises forming said well treatment fluid prior to introducing said well treatment fluid into said wellbore by combining a carrier fluid with said introducable particulate material that is at least partially coated with said silyl-modified polyamide to form said well treatment fluid.

4. The method of claim 3, wherein said method further comprises applying said silyl-modified polyamide to an introducable particulate material to form said introducable particulate material that is at least partially coated with said silyl-modified polyamide, prior to combining said carrier fluid with said introducable particulate material that is at least partially coated with said silyl-modified polyamide to form said well treatment fluid.

5. The method of claim 2, further comprising contacting at least one of introducable or naturally occurring particulates present in at least one of said wellbore or said subterranean formation with said well treatment fluid; and wherein said silyl-modified polyamide is present in said well treatment fluid in an amount effective to at least partially coat and adhere to said introducable or naturally occurring particulates and to reduce or substantially prevent movement of at least a portion of said introducable or naturally occurring particulates contacted by said well treatment fluid when said particulates are subjected to fluid flow within said wellbore or subterranean formation.

6. The method of claim 5, further comprising allowing said silyl-modified polyamide that is at least partially coated and adhered to said introducable or naturally occurring particulates to self-harden to a substantially non-tacky state to which additional individual particulates will not adhere.

7. The method of claim 5, wherein said well treatment fluid further comprises introducable particulate material suspended within said well treatment fluid; and further comprising allowing said silyl-modified polyamide to contact said introducable particulate material while suspended within said well treatment fluid so as to at least partially coat and adhere to at least a portion of said introducable particulate material prior to introducing said well treatment fluid into said wellbore.

8. The method of claim 7, wherein said well treatment fluid is a fracture treatment fluid; and further comprising introducing said fracture treatment fluid into said subterranean formation at a pressure above the fracturing pressure of said subterranean formation and depositing at least a portion of said introducable particulate material into a fracture created in said subterranean formation during said well treatment.

9. The method of claim 7, further comprising placing said introducable particulate material adjacent said subterranean formation to form a fluid-permeable pack that is capable of reducing or substantially preventing the passage of formation particles from said subterranean formation into said wellbore while at the same time allowing passage of formation fluids from said subterranean formation into said wellbore.

10. The method of claim 9, wherein a screen assembly having inner and outer surfaces is disposed within said wellbore, at least a portion of said outer surface of said screen assembly being disposed adjacent said subterranean formation; and wherein said method further comprises placing at least a portion of said introducable particulate material between said outer surface of said screen assembly and said subterranean formation to form said fluid-permeable pack.

11. The method of claim 9, further comprising injecting at least a portion of said introducable particulate material into said subterranean formation at a pressure exceeding a fracture pressure of said subterranean formation.

12. The method of claim 5, wherein said well treatment fluid is a particulate consolidation treatment fluid containing substantially no introducable particulate material, and further comprising allowing said silyl-modified polyamide to self-harden to substantially consolidate at least one of said introducable or naturally occurring particulate materials.

13. The method of claim 2, wherein said subterranean formation comprises a coal seam or coal-bearing formation; and further comprising introducing said well treatment fluid into said coal seam or coal-bearing formation.

14. The method of claim 5, wherein said introducable or naturally occurring particulate materials are subjected to stress cycling within said wellbore or said subterranean formation, and wherein said silyl-modified polyamide is formulated so as to self-harden to be substantially non-tacky and to have a substantially pliable in situ elastic modulus under downhole conditions so as to be capable of yielding upon particle to particle stress between individual particles of said introducable or naturally occurring particulate material that are at least partially adhered to by said silyl-modified polyamide during said stress cycling, so that an in situ creation of fines between individual particles of said introducable or naturally occurring particulate material at least partially adhered to by said silyl-modified polyamide is less than an in situ creation of fines between individual particles of said introducable or naturally occurring particulate material that are not at least partially adhered to by said silyl-modified polyamide.

15. A well treatment method, comprising:
introducing a well treatment fluid into a wellbore penetrating a subterranean formation, said well treatment fluid comprising a silyl-modified polyamide compound that is a reaction product of a polyamide compound and a silating compound; and contacting at least one of introducable or naturally occurring particulates present in at least one of said wellbore or said subterranean formation with said well treatment fluid;

wherein said well treatment fluid comprises introducable particulate material suspended within said well treatment fluid, said introducable particulate material being at least partially coated with said silyl-modified polyamide in an amount effective to reduce or substantially prevent movement of at least a portion of the individual particles of said introducable particulate material when said particulates are subjected to fluid flow within said wellbore or subterranean formation; wherein said silyl-modified polyamide is present in said well treatment fluid in an amount effective to at least partially coat and adhere to said introducable or naturally occurring particulates and to reduce or substantially prevent movement of at least a portion of said introducable or naturally occurring particulates contacted by said well treatment fluid when said particulates are subjected to fluid flow within said wellbore or subterranean formation; or a combination thereof.

16. The method of claim 15, wherein said polyamide comprises a polyamide intermediate compound that is the reaction product of a polyamine and a polyacid, said polyamine comprising at least three amine groups per molecule, said polyacid comprising from about 2 to about 4 acid functionalities per molecule; and wherein said silating compound comprises an alkoxysilane-based silating compound.

17. The method of claim 16, wherein said alkoxysilane-based silating compound comprises at least one substituted alkyl functional group bonded to a silicon atom of said alkoxysilane-based silating compound, said substituted alkyl functional group having a terminal reactive isocyano functionality;

wherein said polyamine comprises a polyamine having from about 1 to about 4 secondary amine groups per molecule and is at least one of an polyalkylene polyamine, aromatic polyamine, or mixture thereof;

wherein said polyacid comprises at least one of a dimer acid having from about 16 to about 36 carbon atoms, a trimer acid having from about 24 to about 54 carbon atoms, or a mixture thereof; and wherein said alkoxysilane-based silating compound has from about 1 to about 3 alkoxysilane functionalities bonded to a silicon atom of said alkoxysilane-based silating compound, each of said alkoxysilane-based functionalities comprising an oxygen atom bonded to said silicon atom and to a terminal alkyl chain having from about 1 to about 18 carbon atoms.

18. The method of claim 17, wherein said polyamine comprises at least one of diethylene triamine, triethylene tetraamine, pentaethylene hexamine, or a mixture thereof; wherein said alkoxysilane-based silating compound comprises a compound with the formula:

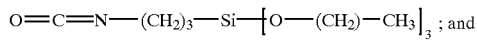

wherein said polyacid comprises at least one of:

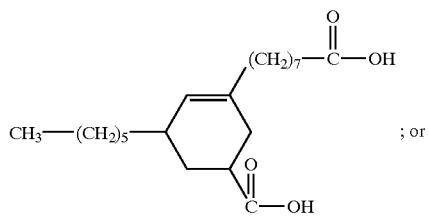

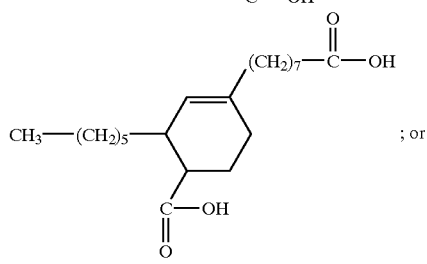

a mixture thereof.

19. The method of claim 18, wherein said polyamine comprises diethylene triamine.

20. The method of claim 18, wherein said polyamine comprises triethylene tetraamine.

21. The method of claim 15, wherein said silyl-modified polyamide compound comprises monomeric units having a formula that is at least one of:

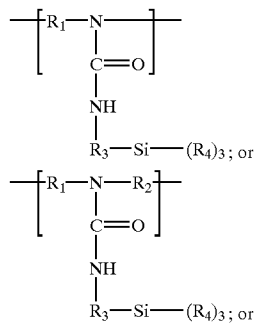

a mixture thereof; and wherein each $R_1$ is independently an alky amine or alkyl amido-amine functional group having a terminal polyacid-based functionality; wherein each $R_2$ is independently an alky amine or alkyl amido-amine functional group; and wherein each $R_3$ is independently an alkyl-based group having from about 1 to about 18 carbon atoms; and wherein each $R_4$ is independently an alkoxy group having from about 1 to about 3 carbon atoms.

22. The method of claim 15, wherein said silyl-modified polyamide compound comprises:

from about 0% to about 100% by weight of monomeric units of the formula

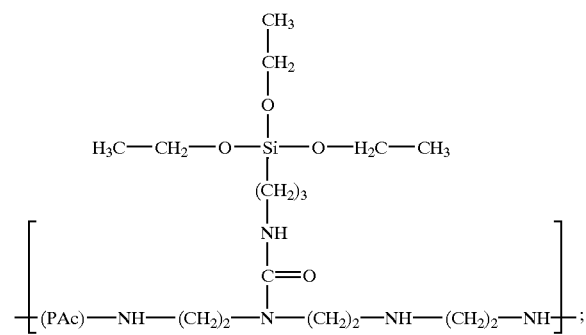

from about 0% to about 100% by weight of monomeric units of the formula

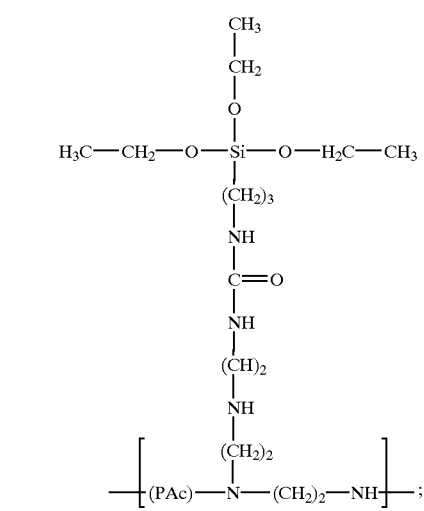

from about 0% to about 100% by weight of monomeric units of the formula

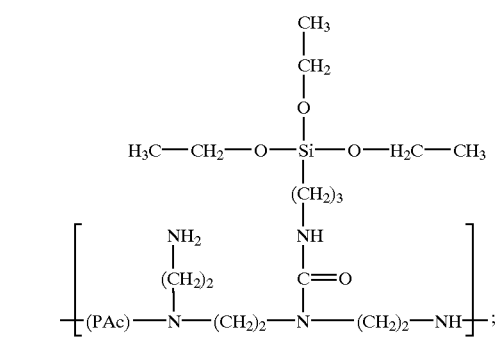

from about 0% to about 100% by weight of monomeric units of the formula

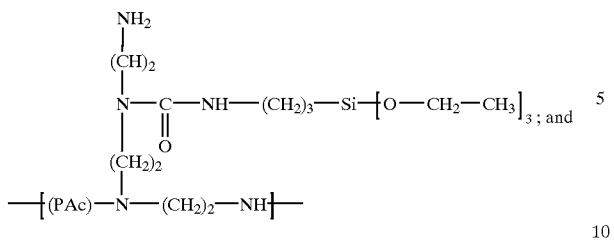

from about 0% to about 100% by weight of monomeric units of the formula

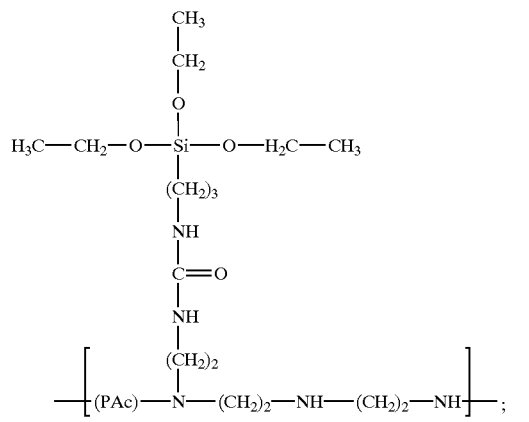

wherein for any given individual monomeric unit of said silyl-modified polyamide compound, (PAc) comprises a polyacid-based functional group based on a polyacid having from about 2 to about 4 carboxyl functionalities.

23. The method of claim 22, wherein for any given individual monomeric unit of said silyl-modified polyamide compound, (PAc) comprises a diacid-based functional group that may be individually either one of:

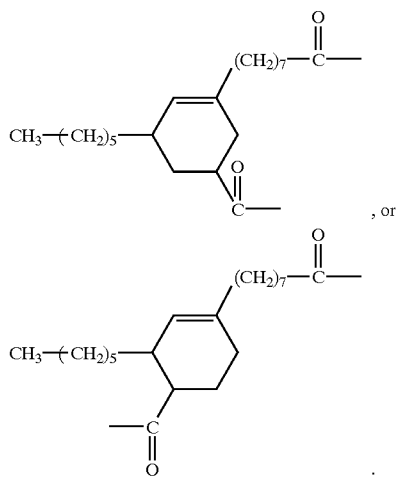

24. The method of claim 22, wherein the total of all said monomeric units present in said silyl-modified polyamide compound comprises about 100% by weight of said silyl-modified polyamide compound.

25. The method of claim 15, wherein said silyl-modified polyamide compound comprises:

from about 0% to about 100% by weight of monomeric units of the formula

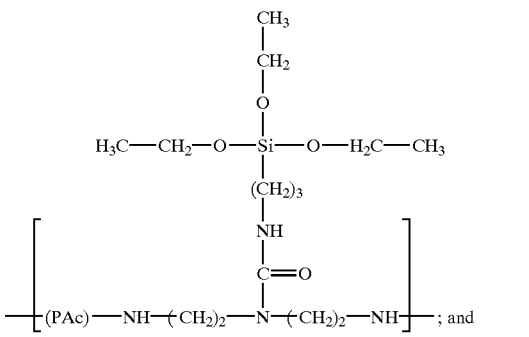

from about 0% to about 100% by weight of monomeric units of the formula

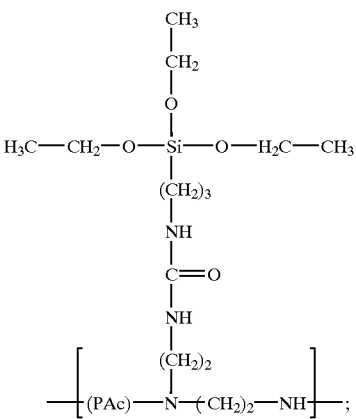

wherein for any given individual monomeric unit of said silyl-modified polyamide compound, (PAc) comprises a polyacid-based functional group based on a polyacid having from about 2 to about 4 carboxyl functionalities.

26. The method of claim 25, wherein for any given individual monomeric unit of said silyl-modified polyamide compound, (PAc) comprises a diacid-based functional group that may be individually either one of:

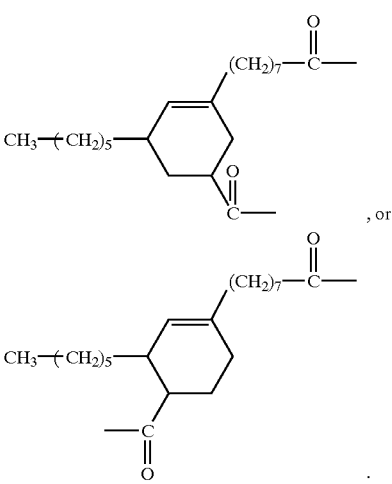

27. The method of claim 25, wherein the total of all said monomeric units present in said silyl-modified polyamide compound comprises about 100% by weight of said silyl-modified polyamide compound.

* * * * *